US012756485B2

(12) United States Patent
Wu et al.

(10) Patent No.: US 12,756,485 B2
(45) Date of Patent: Oct. 6, 2026

(54) CONGESTION CONTROL FOR SIDELINK COMMUNICATION BASED ON NON-SIDELINK ACTIVITY DETECTION

(71) Applicant: QUALCOMM Incorporated, San Diego, CA (US)

(72) Inventors: Shuanshuan Wu, San Diego, CA (US); Arthur Gubeskys, San Diego, CA (US); Gene Wesley Marsh, San Diego, CA (US); Stelios Stefanatos, San Diego, CA (US); Parisa Cheraghi, Cambridge (GB)

(73) Assignee: Qualcomm Incorporated, San Diego, CA (US)

( * ) Notice: Subject to any disclaimer, the term of this patent is extended or adjusted under 35 U.S.C. 154(b) by 443 days.

(21) Appl. No.: 18/035,713

(22) PCT Filed: Dec. 17, 2021

(86) PCT No.: PCT/US2021/073009

§ 371 (c)(1),
(2) Date: May 5, 2023

(87) PCT Pub. No.: WO2022/150246

PCT Pub. Date: Jul. 14, 2022

(65) Prior Publication Data

US 2024/0015582 A1 Jan. 11, 2024

(30) Foreign Application Priority Data

Jan. 7, 2021 (GR) .............................. 20210100013

(51) Int. Cl.
*H04B 17/318* (2015.01)
*H04W 28/02* (2009.01)
*H04W 72/40* (2023.01)

(52) U.S. Cl.
CPC ...... *H04B 17/318* (2015.01); *H04W 28/0252* (2013.01); *H04W 72/40* (2023.01)

(58) Field of Classification Search
CPC ............ H04B 17/318; H04W 28/0252; H04W 28/0289; H04W 72/40
See application file for complete search history.

(56) References Cited

U.S. PATENT DOCUMENTS

2019/0306923 A1 10/2019 Xiong et al.
2020/0120710 A1* 4/2020 Viorel .................. H04W 16/14
(Continued)

FOREIGN PATENT DOCUMENTS

CN 111213393 A 5/2020
WO 2020033628 A1 2/2020
WO 2020067842 A1 4/2020

OTHER PUBLICATIONS

Nokia, "R1-200XXXX Thread#2 for AI 7.2.4.6 QoS Measurement," May 25-Jun. 5, 2020, 3GPP TSG RAN WG1 #101 eMeeting, p. 11-14.*
(Continued)

*Primary Examiner* — Charles C Jiang
*Assistant Examiner* — Ryan C Kavleski
(74) *Attorney, Agent, or Firm* — ArentFox Schiff, LLP

(57) ABSTRACT

In an aspect, the present disclosure includes a method and apparatus for sidelink communications for identifying a number of non-sidelink occupied resources in a measurement window having a total number of resources in an unlicensed spectrum, wherein the total number of resources can be used by sidelink transmissions and non-sidelink transmissions, determining a channel occupancy ratio (CR) limit for a sidelink transmission based on at least a channel busy ratio (CBR) determined accounting for at least the number of non-sidelink occupied resources in the measurement window, calculating a CR for a sidelink transmission,
(Continued)

and transmitting, or refraining from transmitting, the sidelink transmission respectively based on whether the CR does not or does exceed the CR limit.

22 Claims, 12 Drawing Sheets

(56) References Cited

U.S. PATENT DOCUMENTS

| | | | | |
|---|---|---|---|---|
| 2020/0178269 | A1 * | 6/2020 | Haas | H04W 4/40 |
| 2021/0337426 | A1 * | 10/2021 | Lee | H04W 4/40 |
| 2022/0046445 | A1 * | 2/2022 | Morejon Garcia | H04W 74/002 |

OTHER PUBLICATIONS

International Search Report and Written Opinion—PCT/US2021/073009—ISA/EPO—Apr. 4, 2022.

* cited by examiner

CONGESTION CONTROL FOR SIDELINK COMMUNICATION BASED ON NON-SIDELINK ACTIVITY DETECTION

CROSS-REFERENCE TO RELATED APPLICATION

This application claims priority to Greek Patent Application No. 20210100013, entitled "CONGESTION CONTROL FOR SIDELINK COMMUNICATION BASED ON NON-SIDELINK ACTIVITY DETECTION" and filed on Jan. 7, 2021, the disclosure of which is incorporated by reference herein in its entirety.

TECHNICAL FIELD

The present disclosure relates generally to communication systems, and more particularly, to congestion control for sidelink communication based on non-sidelink activity detection, for instance in a vehicle-to-everything (V2X), or other device-to-device (D2D) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eIBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications.

Such systems may be deployed in shared spectrum environments which may include sharing of licensed spectrum and also unlicensed spectrum. Existing shared spectrum congestion control techniques may not be feasible for sidelink communication congestion control in unlicensed spectrum. As used herein, a "resource" may include a resource element, or all the resources in a symbol or slot. For example, a slot may have multiple resources (e.g., multiple subchannels), and when a sidelink signal is detected in one of the resources, the disclosed aspects may determine the slot as a sidelink resource or slot (e.g., because V2X and non-V2X may be likely time division multiplexed).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of sidelink communication is provided. The method includes identifying a number of non-sidelink occupied resources in a measurement window having a total number of resources in an unlicensed spectrum, wherein the total number of resources can be used by sidelink transmissions and non-sidelink transmissions, determining a channel occupancy ratio (CR) limit for a sidelink transmission based on at least a channel busy ratio (CBR) determined accounting for at least the number of non-sidelink occupied resources in the measurement window, calculating a CR for a sidelink transmission, and transmitting, or refraining from transmitting, the sidelink transmission respectively based on whether the CR does not or does exceed the CR limit.

Another example aspect includes an apparatus for sidelink communication, including a processor and a memory configured to store instructions, and a processor communicatively coupled with the memory, wherein the processor is configured to identify a number of non-sidelink occupied resources in a measurement window having a total number of resources in an unlicensed spectrum, wherein the total number of resources can be used by sidelink transmissions and non-sidelink transmissions, determine a channel occupancy ratio (CR) limit for a sidelink transmission based on at least a channel busy ratio (CBR) determined accounting for at least the number of non-sidelink occupied resources in the measurement window, calculate a CR for a sidelink transmission, and transmit, or refraining from transmitting, the sidelink transmission respectively based on whether the CR does not or does exceed the CR limit.

Another example implementation includes a non-transitory computer-readable medium storing instructions for sidelink communication, executable by a processor to store instructions, and one or more processors communicatively coupled with the memory, wherein the one or more processors are configured to identify a number of non-sidelink occupied resources in a measurement window having a total number of resources in an unlicensed spectrum, wherein the total number of resources can be used by sidelink transmissions and non-sidelink transmissions, determine a channel occupancy ratio (CR) limit for a sidelink transmission based on at least a channel busy ratio (CBR) determined accounting for at least the number of non-sidelink occupied resources in the measurement window, calculate a CR for a sidelink transmission, and transmit, or refraining from transmitting, the sidelink transmission respectively based on whether the CR does not or does exceed the CR limit.

An apparatus for sidelink communication, comprising means for identifying a number of non-sidelink occupied resources in a measurement window having a total number of resources in an unlicensed spectrum, wherein the total number of resources can be used by sidelink transmissions and non-sidelink transmissions, means for determining a channel occupancy ratio (CR) limit for a sidelink transmission based on at least a channel busy ratio (CBR) determined accounting for at least the number of non-sidelink occupied resources in the measurement window, means for calculating a CR for a sidelink transmission, and means for transmitting, or refraining from transmitting, the sidelink transmission respectively based on whether the CR does not or does exceed the CR limit.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
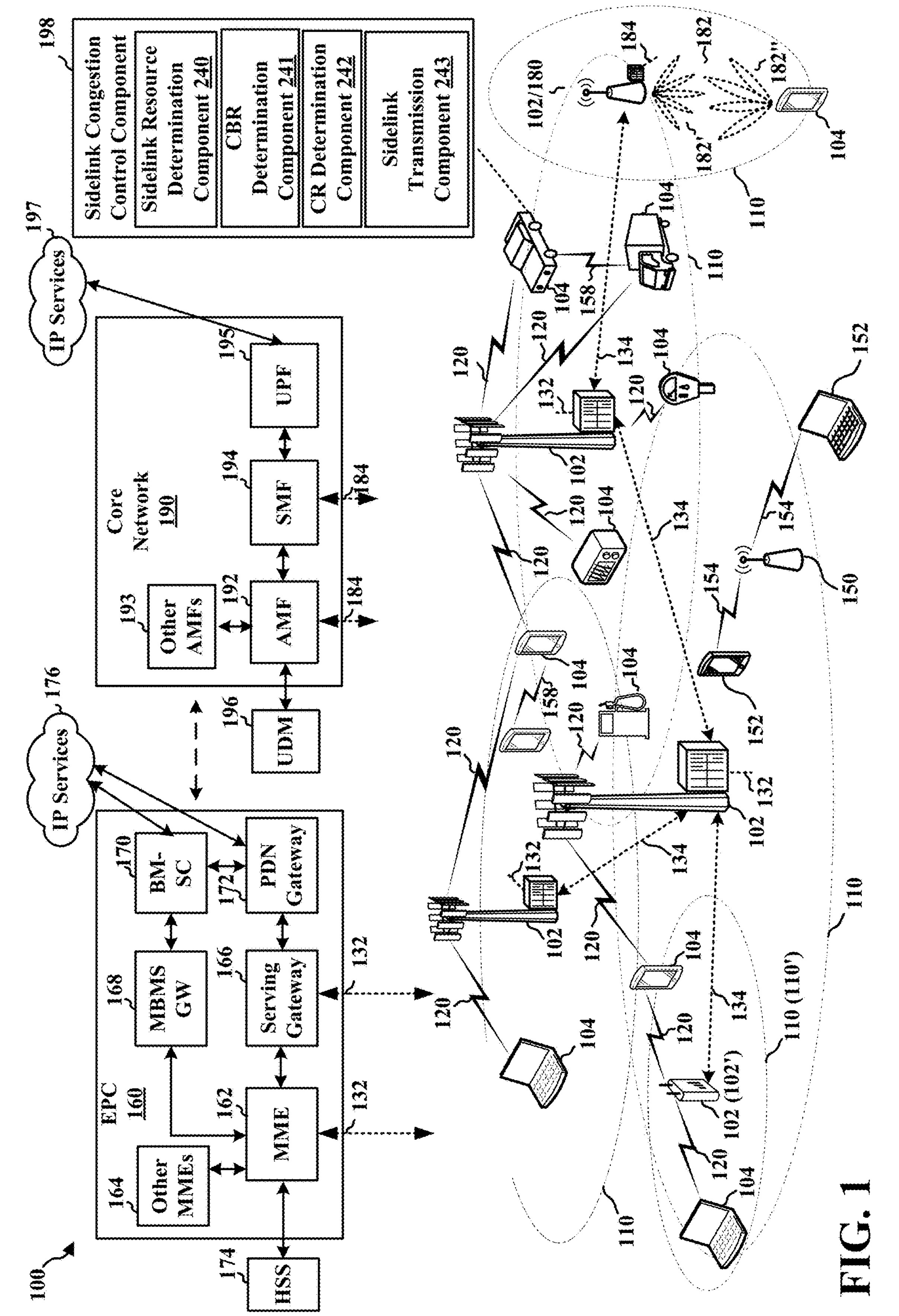
FIG. 1 is a diagram illustrating an example of a wireless communications system and an access network, including an example of a UE having a sidelink congestion control component in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

The current design of cellular sidelink communication systems, such as D2D and/or V2X communication systems, target deployment in licensed spectrum. For instance, these current designs for sidelink communication systems are configured for either sharing spectrum in a licensed cellular band (e.g., uplink spectrum), or in a dedicated ITS (intelligent transportation system) spectrum (e.g., around 5.9 GHz band). However, dedicated spectrum may be not guaranteed in some regions due to scarcity of spectrum. For example, in some areas or countries, there may be dedicated spectrum allocated for Long Term Evolution (LTE) V2X, but no spectrum available for New Radio (NR) V2X. Sidelink communication systems, including V2X communication systems, may have to be deployed in unlicensed spectrum, given that V2X may be the only option in some regions. However, unlicensed spectrum may be shared by other technologies like Wireless Fidelity (Wi-Fi). Further, access to a communication medium in unlicensed spectrum may be subject to regulatory requirements. For example, one of the requirements may be listen-before-talk (LBT), e.g., a device may transmit only if the channel is sensed to be free (e.g., energy measured in the channel is below an energy threshold, referred to as energy-detection based channel sensing).

Sidelink communication techniques such as V2X support an autonomous resource allocation mode, e.g., a user equipment (UE) may access a communication channel based on sensing, without relying on scheduling by a base station (BS). Further, V2X has congestion control that may be enabled in the autonomous resource allocation mode. For example, if the UE is configured with a higher layer parameter CR-Limit and transmits PSSCH in slot n, the UE ensures the following limits for any priority value k, $\Sigma_{i,k}CR(i) \leq CR_{Limit}(k)$, where CR(i) is a channel occupancy ratio (CR) evaluated in slot n-N for Physical Sidelink Shared Channel (PSSCH) transmissions with a priority field in the Sidelink Control Information (SCI) set to i, and $CR_{Limit}(k)$ corresponds to the high layer parameter CR-Limit that is associated with the priority value k and the CBR range which includes the CBR measured in slot n-N, where N is the congestion control processing time. The congestion control processing time N may be based on numerology μ (subcarrier spacing of sidelink) and a processing capability of the UE. The UE may only apply a single processing time capability in sidelink congestion control. For example, for the values of p being 0, 1, 2, 3, the corresponding values of N may be 2, 2, 4 and 8 slots, respectively. Similarly, for the values of p being 0, 1, 2, 3, the corresponding values of N may be 2, 4, 8 and 16 slots, respectively.

A Sidelink Channel Occupancy Ratio (SL CR) evaluated at slot n may be defined as the total number of sub-channels used for its transmissions in slots [n−a, n−1] and granted in slots [n, n+b] divided by the total number of configured sub-channels in the transmission pool over [n−a, n+b], where a may be a positive integer and b may be 0 or a positive integer; a and b are determined by the UE implementation with a+b+1=1000 or $1000\times2^{\mu}$ slots, according to higher layer parameter timeWindowSize-CR, b<(a+b+1)/2, and n+b may not exceed the last transmission opportunity of the grant for the current transmission. SL CR is evaluated for each transmission or re-transmission. In evaluating the SL CR, the UE may assume the transmission parameter used at slot n is reused according to the existing grant(s) in slot [n+1, n+b] without packet dropping. The slot index may be based on a physical slot index. Further, the SL CR may be computed per priority level. For example, SL CR may range from 0.0001 to 1.

A SL Channel Busy Ratio (SL CBR) measured in slot n is defined as the portion of sub-channels in the resource pool whose sidelink (SL) received signal strength indicator (RSSI) (SL RSSI) measured by the UE exceeds a pre-configured threshold sensed over a CBR measurement window [n−a, n−1], wherein a is equal to 100 or $100\times2^{\mu}$ slots, according to higher layer parameter timeWindowSize-CBR. The slot index may be based on a physical slot index. SL CBR may range from 0.01 to 1. SL RSSI may be defined as the linear average of the total received power (in Watts) observed in the configured sub-channel in OFDM symbols of a slot configured for PSCCH and PSSCH starting from the second OFDM symbol. For example, for frequency range 1, the reference point for the SL RSSI may be the antenna connector of the UE. In another example, for frequency range 2, the SL RSSI may be measured based on the combined signal from antenna elements corresponding to a given receiver branch. In another example, for frequency range 1 and 2, if receiver diversity is in use by the UE, the reported SL RSSI value may not be lower than the corresponding SL RSSI of any of the individual receiver branches.

The existing congestion control techniques for sidelink communication may not be applicable for implementing congestion control in unlicensed spectrum due to problems such as activities from other radio access technologies (RATs) (e.g., Wi-Fi) affecting the effectiveness of the congestion control specified for licensed/dedicated spectrum sidelink communication. Therefore, CBR evaluated based on the SL RSSI measurement may no longer reflect sidelink UE channel occupancy.

The improved congestion control techniques according to the present disclosure are useful for sidelink (including V2x) congestion control in unlicensed spectrum. In an aspect, the congestion control techniques described herein include not only congestion level of sidelink transmissions, but also overall congestion level of a communication channel in the unlicensed spectrum, and activities from other RATs are also taken into account. The UE may perform congestion control by considering sidelink communication activity, as well as resource occupancy by other RATs (e.g., Wi-Fi transmissions). The procedures at the UE for transmission of PSSCH in unlicensed spectrum can include determining non-sidelink occupied resources or non-sidelink occupied slots in a measurement window (e.g., a CBR measurement window) and determining a CR limit based at least on a CBR measurement that takes into account non-sidelink occupied resources or non-sidelink occupied slots occupancy. The UE may then make a transmission decision for the PSSCH based on the CR limit and CR(s) evaluated in a CR evaluation window. For example, the transmission decision by the UE may include whether the UE can or cannot transmit the PSSCH.

The UE may determine non-sidelink occupied resources or non-sidelink occupied slots as the resources such as time resources (e.g., slots) occupied by non-sidelink transmissions (e.g., Wi-Fi) in the measurement window. The UE may consider other resources in the measurement window as sidelink resources (e.g., sidelink resources can include resources that have been occupied by sidelink transmissions and resources that are idle, i.e., resources not occupied but available for sidelink transmission). For determining the CR limit, and the sidelink and non-sidelink occupied resources or non-sidelink occupied slots, the UE may implement one or more techniques as described below with reference to FIGS. 1-9.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In an aspect, UE 104 may utilize sidelink congestion control component 198 to implement sidelink congestion control and determine whether to transmit a sidelink transmission. The sidelink congestion control component 198 may include a sidelink resource determination component 240 for determining sidelink and non-sidelink occupied resources or non-sidelink occupied slots in a measurement window (e.g., a CBR measurement window). The sidelink congestion control component 198 may include a CBR determination component 241 for determining a CBR in the measurement window and a CR determination component 242 for determining a CR limit for a sidelink transmission based on at least the CBR determined accounting for at least the number of non-sidelink occupied resources or non-sidelink occupied slots in the measurement window. The CR determination component 242 may also calculate a CR for the sidelink transmission. The sidelink congestion control component 198 may also include a sidelink transmission component 243 for transmitting, or refraining from transmitting, the sidelink transmission respectively based on whether the CR does not or does exceed the CR limit. The details of the sidelink congestion control component 198 are also described below in FIGS. 4-9.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
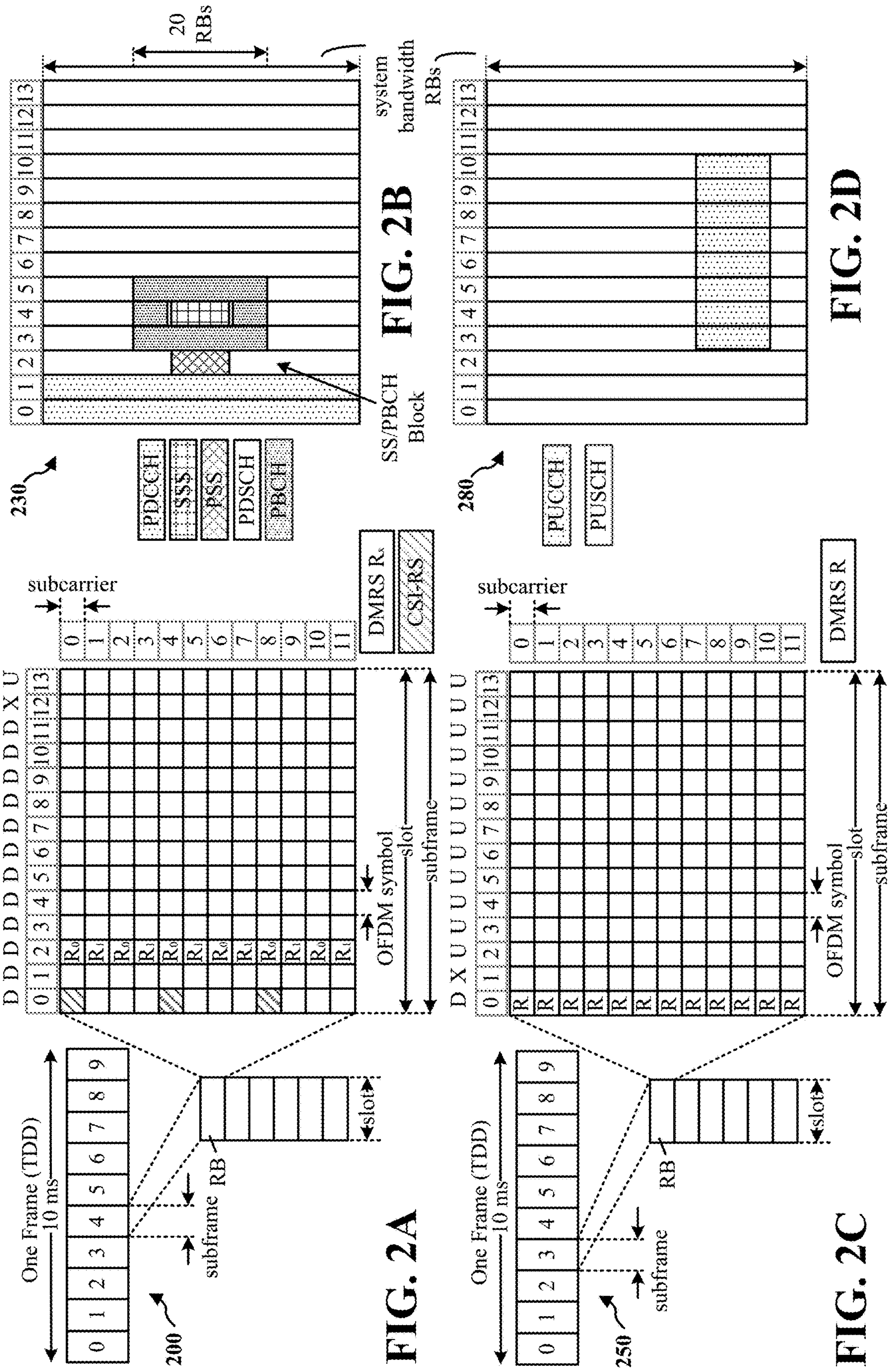
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

FIGS. 2A-2D include diagrams of example frame structures and resources that may be utilized in communications between the base stations 102, and the UEs 104*a/b*, described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to 24*15 kHz, where y is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
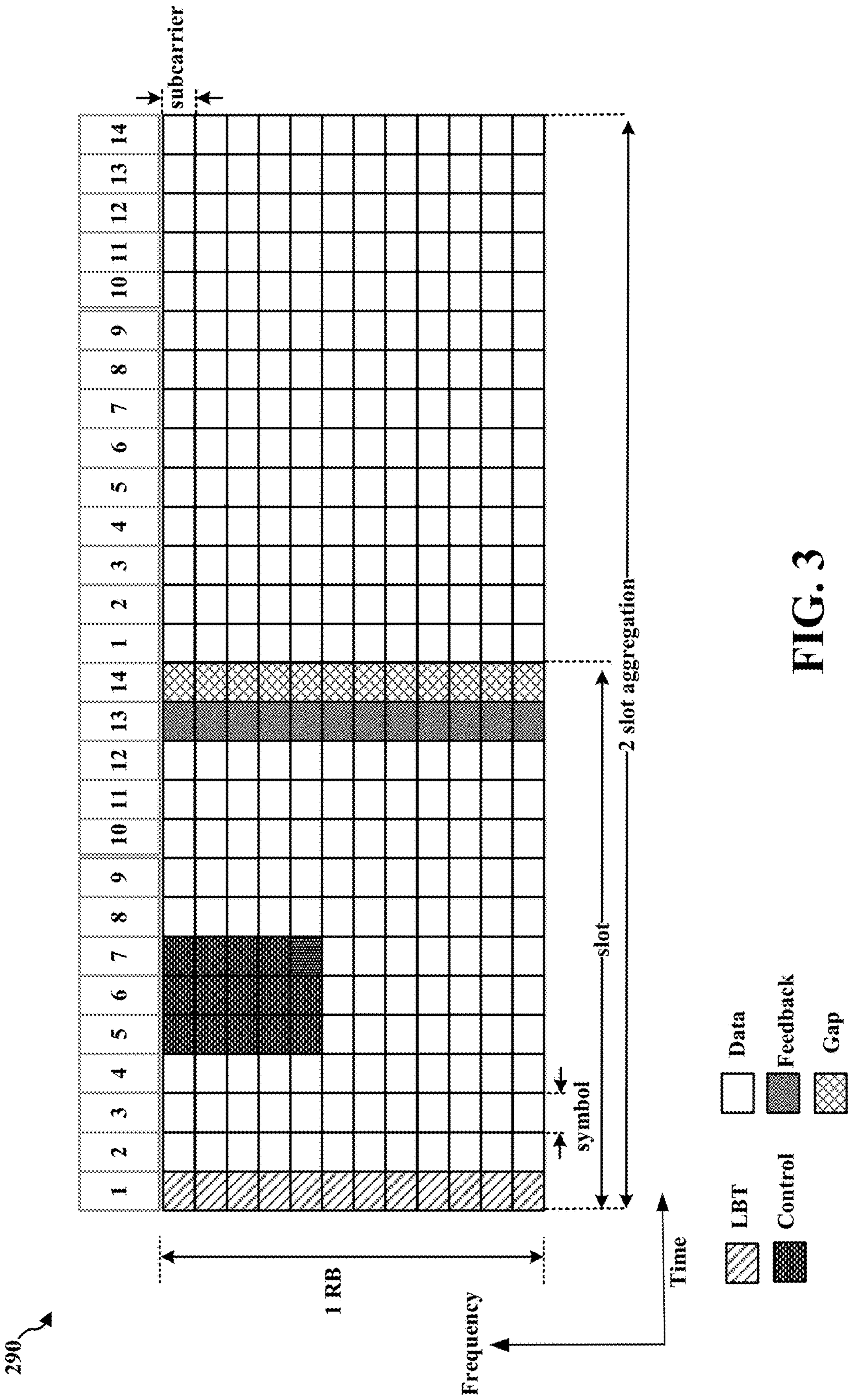
FIG. 3 is an example diagram illustrating a frame structure and resources for sidelink communications, in accordance with various aspects of the present disclosure.

FIG. 3 is a diagram 290 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some aspects, at least one symbol at the beginning of a slot may be used by a transmitting device to perform a Listen Before Talk (LBT) operation prior to transmitting. In some aspects, at least one symbol may be used for feedback, as described herein. In some aspects, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some aspects, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
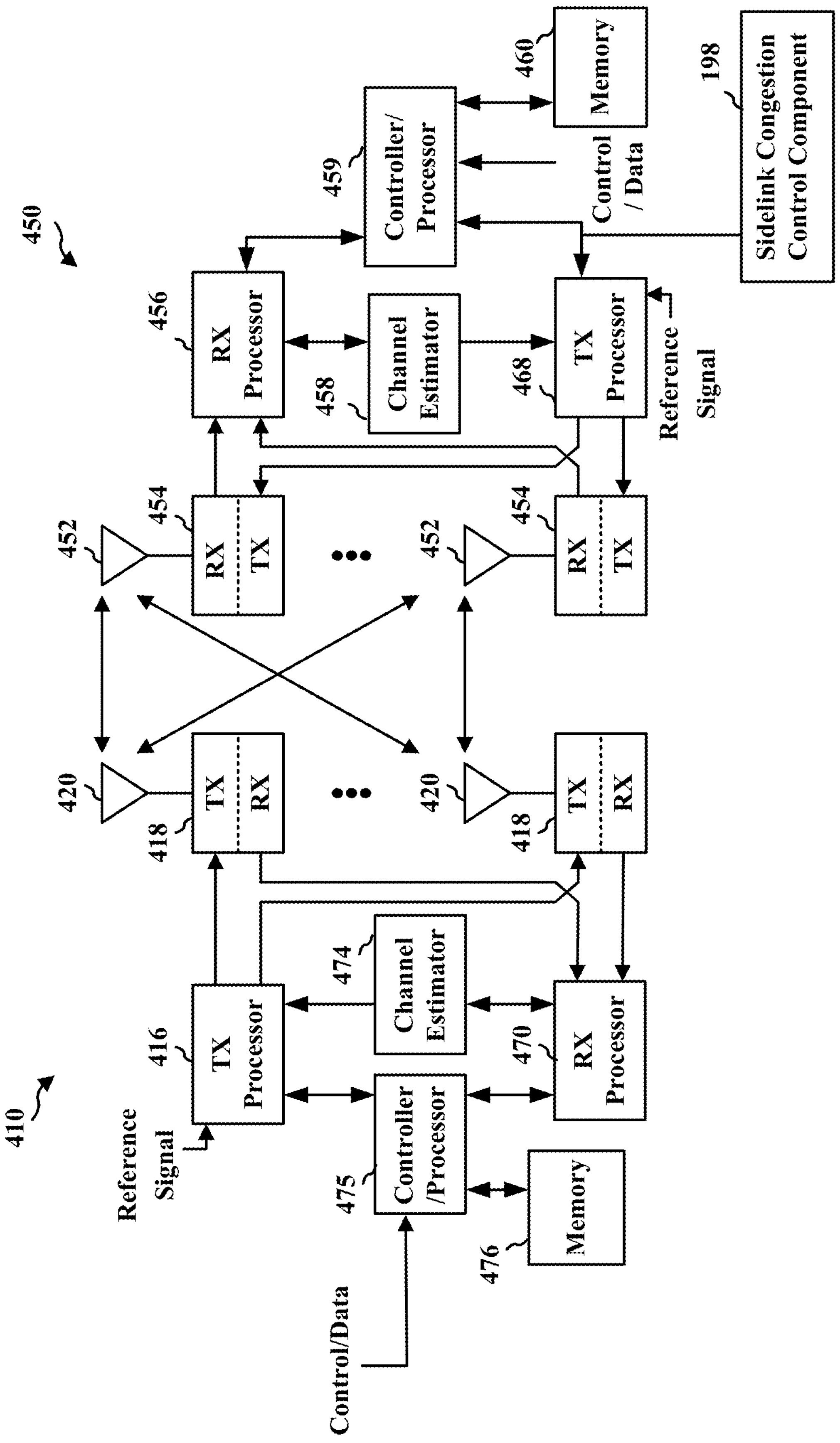
FIG. 4 is a diagram illustrating an example of a base station and user equipment (UE) in an access network, in accordance with various aspects of the present disclosure.

FIG. 4 is a block diagram of a base station 410 in communication with a UE 450 in an access network, where the base station 410 may be an example of base station 102 and where UE 450 may be an example of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the sidelink congestion control component 198 of FIG. 1. For simplification, all the components of the sidelink congestion control component 198 are not shown in FIG. 4.

Figure 5:
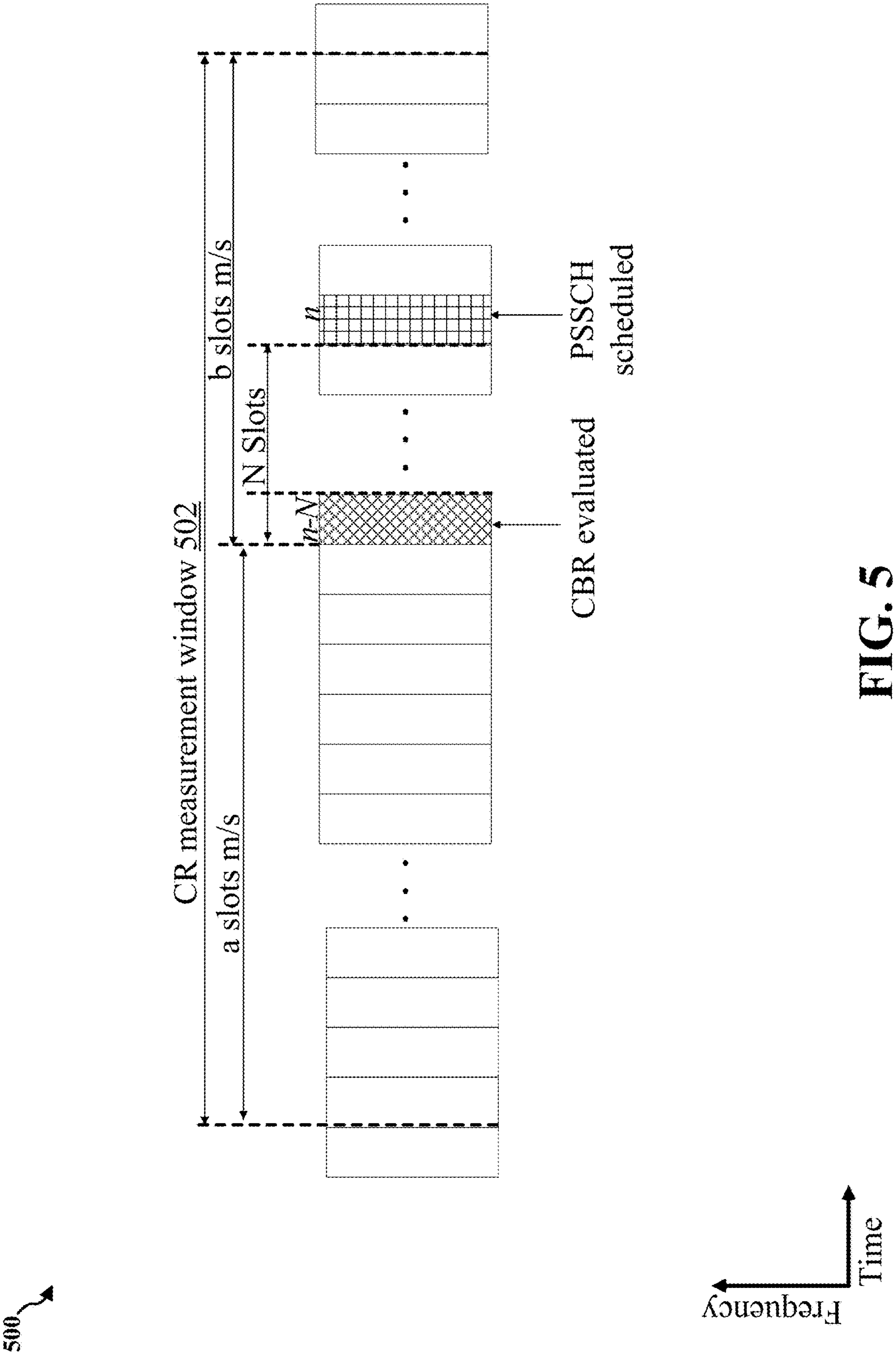
FIG. 5 is a diagram illustrating an example of a CR evaluation window, including one or both of sidelink and non-sidelink resources across frequency and over time in an unlicensed spectrum, in accordance with various aspects of the present disclosure.

Referring to FIG. 5, a graph 500 of resources across frequency and over time includes a channel occupancy ratio (CR) measurement window 502 (also referred to as a CR evaluation window) for use in evaluating a Sidelink Channel Occupancy Ratio (SL CR). In a licensed spectrum, the SL CR evaluated at slot n may be defined as the total number of sub-channels used for its transmissions in slots [n−a, n−1] and granted in slots [n, n+b] divided by the total number of configured sub-channels in the transmission pool over [n−a, n+b], where a may be a positive integer and b may be 0 or a positive integer; a and b are determined by the UE implementation with a+b+1=1000 or $1000\times2^{\mu}$ slots, according to higher layer parameter timeWindowSize-CR, b<(a+b+1)/2, and n+b may not exceed the last transmission opportunity of the grant for the current transmission. SL CR is evaluated for each transmission or re-transmission. In evaluating the SL CR, the UE may assume the transmission parameter used at slot n is reused according to the existing grant(s) in slot [n+1, n+b] without packet dropping. The slot index may be based on a physical slot index. Further, the SL CR may be computed per priority level. For example, SL CR may range from 0.0001 to 1.

Figure 6:
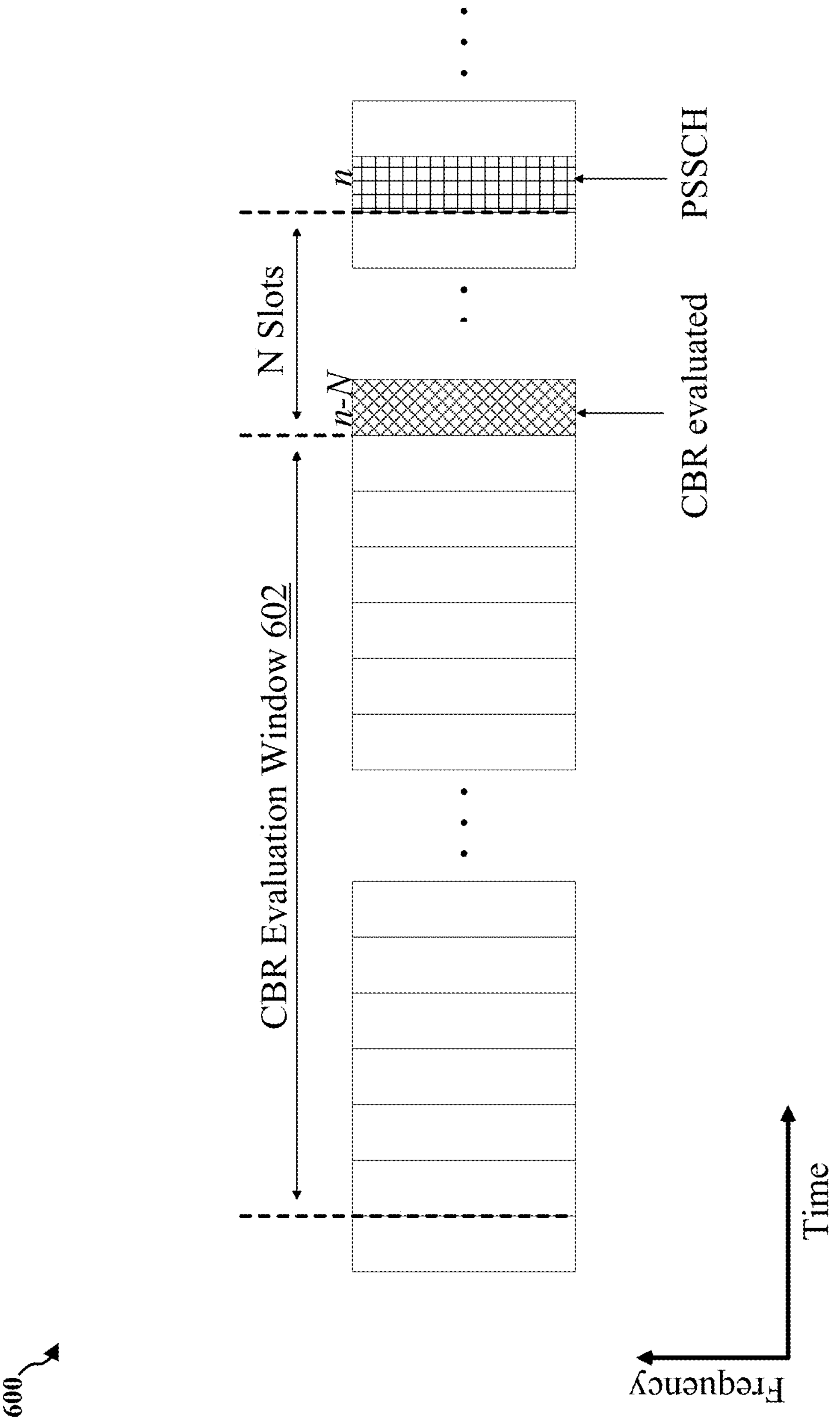
FIG. 6 is a diagram illustrating an example of a CBR evaluation window associated with sidelink and non-sidelink resources, across frequency and over time, in an unlicensed spectrum, in accordance with various aspects of the present disclosure.

Referring to FIG. 6, a graph 600 of resources across frequency and over time in an unlicensed spectrum includes a CBR measurement window 602 (also referred to as a CBR evaluation window) for use in determining a SL Channel Busy Ratio (SL CBR). In a licensed spectrum, the SL CBR measured in slot n is defined as the portion of sub-channels in the resource pool whose sidelink (SL) received signal strength indicator (RSSI) (SL RSSI) measured by the UE exceeds a pre-configured threshold sensed over a CBR measurement window [n−a, n−1], wherein a is equal to 100 or $100\times2^{\mu}$ slots, according to higher layer parameter timeWindowSize-CBR. The slot index may be based on a physical slot index. SL CBR may range from 0.01 to 1. SL RSSI may be defined as the linear average of the total received power (in Watts) observed in the configured sub-channel in OFDM symbols of a slot configured for PSCCH and PSSCH starting from the second OFDM symbol. For example, for frequency range 1, the reference point for the SL RSSI may be the antenna connector of the UE. In another example, for frequency range 2, the SL RSSI may be measured based on the combined signal from antenna elements corresponding to a given receiver branch. In another example, for frequency range 1 and 2, if receiver diversity is in use by the UE, the reported SL RSSI value may not be lower than the corresponding SL RSSI of any of the individual receiver branches.

According to the present aspects, the sidelink congestion control component 198 is configured to make congestion control decisions that consider V2X communication activity, as well as resource occupancy by other RATs/technologies (e.g., Wi-Fi transmissions). For example, in one proposed UE procedure to transmit PSSCH in unlicensed spectrum, the sidelink congestion control component 198 determine non-V2X resources in a window (e.g., CBR measurement window), determine a CR limit based at least on a CBR measurement which takes into account the non-V2X resource occupancy, and make a transmission decision for the PSSCH based on the CR limit and CR(s) evaluated in a CR evaluation window. For instance, the transmission decision may be whether the UE can transmit the PSSCH or not.

In these aspects, in one example, the sidelink congestion control component 198 may identify the non-V2X resources as the time resources (e.g., slots) occupied by non-V2X transmissions (e.g., Wi-Fi) in a time window (e.g., CBR measurement window). Accordingly, the other resources in the CBR measurement window can be considered as V2X resources. Consequently, the sidelink congestion control component 198 may identify V2X resources as resources that have been occupied by V2X transmissions and resources that are idle, or, in other words, resources not occupied but available for V2X transmission.

For example, the sidelink congestion control component 198 may operate the CBR determination component 241 and the CR determination component 242 to respectively determine a CBR and a CR limit for sidelink communications in an unlicensed spectrum based on one of the two alternatives as described below with reference to FIGS. 5 and 6. In these aspects, the sidelink congestion control component 198 may operate the sidelink resource determination component 240 to identify the sidelink resources and/or the non-sidelink occupied resources or non-sidelink occupied slots in the respective evaluation windows based on one of the four alternatives as described below with reference to FIG. 7.

In a first alternative for determining a CR limit, the sidelink congestion control component 198 may determine a CR limit based on a CBR taking into account non-sidelink (e.g., non-V2X) resource occupancy. In this alternative, the sidelink resource determination component 240 may identify V2X and non-V2X resources in the CBR measurement window, and the CBR determination component 241 may identify the busy sub-channels in the V2X resources (e.g., subchannel having RSSI greater than an RSSI threshold). Then, the first alternative for determining a CR limit may include two sub-alternatives.

In a first sub-alternative of the first alternative for determining a CR limit, the sidelink congestion control component 198 may measure a first CBR, which is the CBR in V2X resources in the CBR measurement window (portion of busy sub-channels in V2X resources in the window). Then, the sidelink congestion control component 198 may determine a second CBR based on the first CBR and the amount of non-V2X resource. For example, the second CBR=first CBR*(1−non-V2X resource ratio). Subsequently, the sidelink congestion control component 198 may determine the CR limit based on the second CBR. It should be noted that in these aspects, the non-V2X resource ratio is the ratio of non-V2X resources in the time window).

In a second sub-alternative of the first alternative for determining a CR limit, the sidelink congestion control component 198 may measure a CBR as the CBR in the CBR measurement window reflecting a ratio of busy V2X subchannels. In this case, the sidelink congestion control component 198 identifies V2X slots first, and then identifies busy V2X subchannels in the V2X slots. Then, the sidelink congestion control component 198 determines the CBR as the ratio of number of busy V2X subchannels over total number of subchannels in the CBR measurement window. Subsequently, the sidelink congestion control component 198 determines a CR limit based on the CBR.

It should be noted that the two sub-alternatives achieve the same effect.

In a detailed example, which should not be construed as limiting, for the first sub-alternative, if the CBR measurement window=100 slots (5 subchannels per slot=500 subchannels in total), and 40 slots are identified as V2X slots (e.g., 200 subchannels in V2X slots), and if 160 of the 200 subchannels are busy (e.g., occupied by V2X transmission), then the first CBR=160/200 or 0.8. Then, the UE determines the second CBR as follows: second CBR=0.8*0.4=0.32, where 0.4 is the V2X ratio=40/100, which may be calculated as (1−non-V2X ratio), i.e., (1−0.6). For the second sub-alternative using these numbers, the CBR=160/500=0.32. Thus, both sub-alternatives achieve the same result.

In an example implementation of the first alternative for determining a CR limit, for example, the sidelink resource determination component 240 may identify a number of sidelink resources or sidelink slots in the CBR measurement window 602 based on a total number of slots in the CBR measurement window 602 minus the number of non-sidelink occupied resources or non-sidelink occupied slots. In one example, the CBR determination component 241 may receive the information about the sidelink resources or sidelink slots in the CR measurement window 502 from the sidelink resource determination component 240. The CBR determination component 241 may identify a number of busy sidelink resources or busy sidelink slots in the number of sidelink resources or sidelink slots.

According to the first sub-alternative for determining a CR limit, the CBR determination component 241 may then determine a first CBR based at least on the number of busy sidelink resources or busy sidelink slots and the total number of slots, and a second CBR based on the first CBR and the number of non-sidelink occupied resources or non-sidelink occupied slots. For example, the measurement window 502 may include 100 total resources. The sidelink resource determination component 240 may determine n1 as the number of sidelink resources or sidelink slots and n2 as the number of non-sidelink occupied resources or non-sidelink occupied slots (as described below with reference to FIG. 6). In n1 sidelink resources, there may be m1 subchannels in total, and mb of the subchannels may be identified as busy (e.g., the SL RSSI in mb subchannels may be greater than an RSSI threshold). In the n2 non-sidelink occupied resources or non-sidelink occupied slots, there may be m2 subchannels in total. The total number of subchannels in the measurement window 502 are m1+m2.

In the first sub-alternative of the first alternative, the CBR determination component 241 may determine the first CBR as mb/m1. The CBR determination component 241 may also determine a non-sidelink resource ratio (nSLRR) based on the number of non-sidelink occupied resources or non-sidelink occupied slots in the measurement window relative to the total number of slots in the measurement window. The CBR determination component 241 may then determine the second CBR by multiplying the first CBR by (1−nSLRR). For example, the CBR determination component 241 may determine the second CBR as (mb/m1)*(n1/(n1+n2)). The CR determination component 242 may determine the CR limit based at least on the second CBR.

In an example implementation according to the second sub-alternative of the first alternative for determining a CR limit, the sidelink resource determination component 240 may identify the number of sidelink resources or sidelink slots in the measurement window based on the total number of slots minus the number of non-sidelink occupied resources or non-sidelink occupied slots. The CR determination component 242 may identify a number of busy sidelink resources or busy sidelink slots in the number of sidelink resources or sidelink slots. The CBR determination component 241 may then determine a CBR based on the number of busy sidelink resources or busy sidelink slots and the total number of slots. For example, the total number of subchannels in the measurement window 502 are m1+m2 (as described above in the example for the first alternative), and mb are the number of busy subchannels. The CBR determination component 241 may determine the CBR as mb/(m1+m2). The CR determination component 242 may determine the CR limit based on the CBR.

In a second alternative for determining a CR limit, the sidelink congestion control component 198 may determine the CR limit based on V2X CBR and non-V2X resource ratio. In an aspect, for example, the sidelink congestion control component 198 may identify V2X and non-V2X resources in the CBR measurement window, and determine a non-V2X resource ratio, e.g., a portion of non-V2X resources in the window. Additionally, the sidelink congestion control component 198 may identify the busy subchannels in the V2X resources (e.g., a subchannel having RSSI greater than an RSSI threshold) and measure a V2X CBR, which may be the CBR in V2X resources in the CBR measurement window (e.g., portion of busy sub-channels in V2X resources in the window). Thus, the sidelink congestion control component 198 may determine the CR limit based on the non-V2X resource ratio and the V2X CBR.

In one example, the CR limit is mapped from the V2X CBR and the non-V2X resource ratio. For the same V2X CBR value, if the non-V2X ratio is different, then a different CR limit may be determined. In this example, the principle is that, given a CBR value, the larger the non-V2X ratio, then the larger the CR limit. The rationale for this principles is that a larger non-V2X ratio means less resources available for V2X transmission, so then a larger CR limit means equivalently, there is an effective smaller CBR value. This example may be implemented by specifying multiple mapping tables for V2X CBR to CR limit mapping, where each table corresponds to a different non-V2X resource ratio.

In an example implementation of the second alternative for determining the CR limit, the CBR determination component 241 may identify a number of sidelink resources or sidelink slots in the measurement window based on the total number of slots minus the number of non-sidelink occupied resources or non-sidelink occupied slots. The CBR determination component 241 may determine a non-sidelink resource ratio in the measurement window 502 corresponding to the number of non-sidelink occupied resources or non-sidelink occupied slots relative to the total number of slots. The CBR determination component 241 may identify the number of sidelink resources or sidelink slots in the measurement window based on the total number of slots minus the number of non-sidelink occupied resources or non-sidelink occupied slots. The CBR determination component 241 may determine a CBR based on the number of busy sidelink resources or busy sidelink slots and the number of sidelink resources or sidelink slots. The CBR determination component 241 may identify the number of busy sidelink resources or busy sidelink slots by performing a sidelink RSSI measurement in each of the number of sidelink resources or sidelink slots. For each of the number of sidelink resources or sidelink slots, the CBR determination component 241 may determine whether the sidelink RSSI measurement is above an RSSI threshold. The CBR determination component 241 may determine a sidelink resource of the number of sidelink resources or sidelink slots as one of the number of busy sidelink resources or busy sidelink slots based on determining that the sidelink RSSI measurement of the sidelink resource is above the RSSI threshold. For example, mb being the number of busy subchannels of the m1 subchannels in n1 sidelink resources, and n2 being the number of non-sidelink occupied resources or non-sidelink occupied slots (as described above in example for the first alternative). The CBR determination component 241 may determine the CBR as mb/m1, using the non-sidelink resource ratio n2/(n1+n2). The CR determination component 242 may then determine a CR limit based at least on the non-sidelink resource ratio and the CBR. In the second alternative, the CR determination component 242 determines the CR limit that may be mapped to the non-sidelink resource ration. For example, for the same CBR value in the measurement window 502, the non-sidelink resource may be different. In one example, for a given CBR value, the larger the non-sidelink resource ratio, the larger may be the CR limit (because a larger non-sidelink resource ratio would mean a lesser number of the resources being available for sidelink transmission, then a larger CR limit would equivalently mean, there is an effective smaller CBR value).

The sidelink transmission component 243 may use the CR limit determined by the CR determination component 242 using any of the above alternatives to transmit or refraining from transmitting a sidelink transmission based on the CR limit. For example, the sidelink transmission component 243 may receive a CR determined by the CR determination component 242 in a CR evaluation window. The sidelink transmission component 243 may transmit the sidelink transmission when the CR does not exceed the CR limit. The sidelink transmission component 243 may refrain from transmitting the sidelink transmission when the CR exceeds the CR limit.

Figure 7:
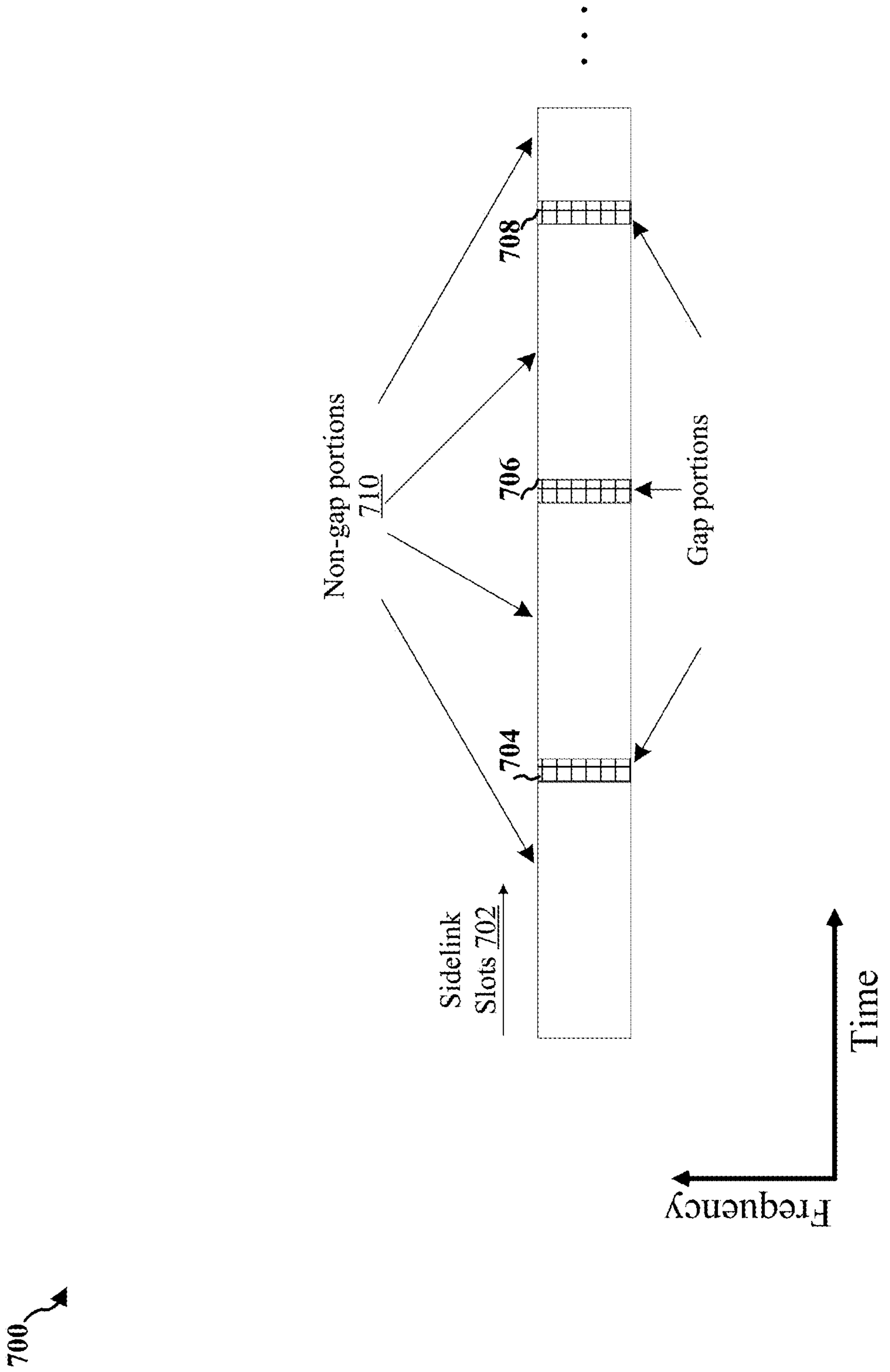
FIG. 7 is diagram illustrating an example of a plurality of communication slots across frequency and over time, with gap and non-gap portions, that can be determined to include sidelink resources and/or non-sidelink resources in accordance with various aspects of the present disclosure.
Figure 8:
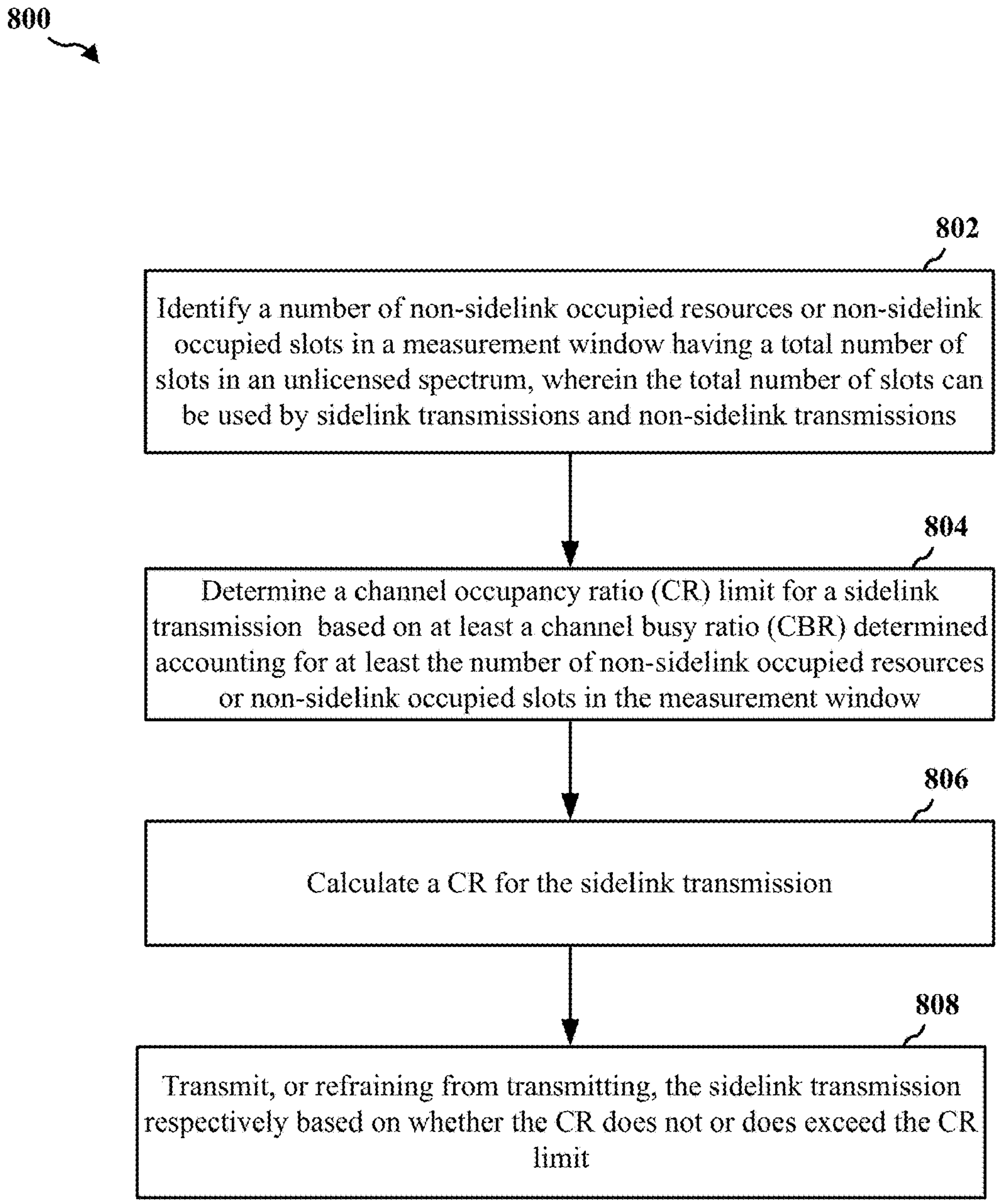
FIG. 8 is an example flowchart of a method of sidelink communication of a network entity performing a sidelink transmission, in accordance with various aspects of the present disclosure.

Referring to FIG. 7, the diagram 700 includes sidelink slots 702 with time domain represented along x axis and frequency domain along y axis. The sidelink slots 702 may include one or more gap portions represented by gap portions 704, 706 and 708. The gap portions 704, 706 and 708 may not have any sidelink transmissions. The sidelink slots 702 may include non-gap portion 710 during which the sidelink slots 702 may have sidelink transmissions.

The sidelink congestion control component 198 may use any one of four alternatives for determining V2X resources and non-V2X resources in the slots 702. In this case, there are three types of slots in V2X systems in the unlicensed spectrum:

Type 1: occupied V2X slots (having V2X transmissions);

Type 2: occupied non-V2X slots (having other RATs' transmissions); and

Type 3: idle slots (having no activity, e.g., lower energy detected).

In a first alternative for determining V2X/non-V2X resources, the sidelink congestion control component 198 may identify a slot as a V2X slot if the slot has sidelink transmission or sidelink specific signals are detected. Otherwise, the slot is considered as non-V2X slot.

In a second alternative for determining V2X/non-V2X resources, the sidelink congestion control component 198 may identify a slot as a V2X slot if the slot has been included in a sidelink channel occupancy (or channel occupancy time, COT). Otherwise, the slot is determined as non-V2X slot. For example, the slot is determined to be in a SL COT if a signaling that has been decoded (e.g., control signaling) in the slot or in a different slot (e.g., an earlier slot or a later slot) indicates that the slot is part of a SL COT.

In a third alternative for determining V2X/non-V2X resources, the sidelink congestion control component 198 may detect non-V2X activity to determine the type of resource. In other words, a slot that is free from non-V2X activity is identified as a V2X slot. Otherwise, the slot is determined as non-V2X slot. In this case, non-V2X activity detection can be based on energy detection. For example, if the UE senses energy in at least a gap (a gap has no V2X transmission), then the slot is a V2X slot if energy sensed in the gap is smaller than an energy threshold.

In a fourth alternative for determining V2X/non-V2X resources, the sidelink congestion control component 198 may detect a V2X slot by SCI decoding and/or energy detection. In this case, a slot is a V2X slot if either it has sidelink transmission/signal detected, and/or it is sensed to be free from non-V2X activity.

In one example implementation, the sidelink resource determination component 240 may identify the number of non-sidelink occupied resources or non-sidelink occupied slots in the CBR measurement window 602 (as described above) having a total number of slots in the unlicensed spectrum. As noted, there may be three types of resources or slots in the unlicensed spectrum: a first type of resources or slots occupied with sidelink transmissions, a second type of resources or slots occupied with non-sidelink transmissions (e.g., RATs such as Wi-Fi), and a third type of idle resources or idle slots (i.e., resources or slots having no activity, for example where the energy detected in the resources is lower than an energy threshold). The sidelink resource determination component 240 may identify the number of non-sidelink occupied resources or non-sidelink occupied slots in the measurement window 602 based on one of the four alternatives as described below.

In an example of the first alternative for determining V2X/non-V2X resources, the sidelink resource determination component 240 may determine a number of sidelink resources or sidelink slots in the measurement window 602 by determining whether an existing sidelink channel or a sidelink signal is detected in each resource or slot of the total number of slots in the measurement window 602. For example, the sidelink resource determination component 240 may detect the presence of an existing sidelink channel, a sidelink-specific signal (e.g., a sidelink hybrid automatic repeat request (HARQ) transmission) in a resource. The sidelink resource determination component 240 may determine the resource or all resources in that slot as a sidelink resource based on detection of the existing sidelink channel or the sidelink signal in the resources. In absence of detecting the presence of an existing sidelink channel or a sidelink-specific signal, the sidelink resource determination component 240 may determine the resource or slot as a non-sidelink occupied resource.

In an example of the second alternative for determining V2X/non-V2X resources, the sidelink resource determination component 240 may identify the number of non-sidelink occupied resources or non-sidelink occupied slots in the CBR measurement window 602 by determining a number of sidelink resources or sidelink slots in the CBR measurement window 602. The sidelink resource determination component 240 may determine the number of sidelink resources or sidelink slots by determining whether a resource or slot of the total number of slots in the CBR measurement window 602 is included in a sidelink channel occupancy (e.g., sidelink channel occupancy time (SL COT)). For example, the sidelink resource determination component 240 may decode a first signaling in the respective resource indicating that the resource is included in the sidelink channel occupancy, or the sidelink resource determination component 240 may decode a second signaling in an earlier resource relative to the respective resource, and the second signaling indicating that the respective resource is included in the sidelink channel occupancy, or the sidelink resource determination component 240 may decode a third signaling in a later resource relative to the respective resource, and the third signaling indicating that the respective resource is included in the sidelink channel occupancy, to determine that the respective resources is included in the sidelink channel occupancy. The sidelink resource determination component 240 may determine the resource or all resources in that slot as sidelink resources based on determining that the resource is included in the sidelink channel occupancy. On determining that the resource is not included in the sidelink channel occupancy, the sidelink resource determination component 240 may determine the resource as a non-sidelink occupied resource.

In an example of the third alternative for determining V2X/non-V2X resources, the sidelink resource determination component 240 may identify the number of non-sidelink occupied resources or non-sidelink occupied slots in the CBR measurement window 602 by determining a number of sidelink resources or sidelink slots in the CBR measurement window 602. The sidelink resource determination component 240 may determine the number of sidelink resources or sidelink slots by determining whether a resource of the total number of slots includes a transmission from one or more radio access technologies (RATs) different from a sidelink communication. The sidelink resource determination component 240 may determine the resource as one of the number of sidelink resources or sidelink slots based on determining that the resource includes an absence of transmission from the one or more RATs different from the sidelink communication. For example, the sidelink resource determination component 240 may measure an energy level in one or more energy detection (ED) windows in the resource or the slot having the resource. The sidelink resource determination component 240 may then determine that the energy level is less than or equal to an ED threshold. In one example, referring to FIG. 7, the ED window may be a time window in one of the gap portions 704, 706, or 708 of the sidelink slots 702 in the CBR measurement window 602. The gap portions 704, 706 and 708 have no sidelink transmissions. On determining that the resource does not include an absence of the transmission from RATs other than sidelink communication in the sidelink channel occupancy, the sidelink resource determination component 240 may determine the resource as a non-sidelink occupied resource.

In an example of the fourth alternative for determining V2X/non-V2X resources, the sidelink resource determination component 240 may identify the number of non-sidelink occupied resources or non-sidelink occupied slots in the CBR measurement window 602 by determining a number of sidelink resources or sidelink slots in the CBR measurement window 602. The sidelink resource determination component 240 may determine the number of sidelink resources or sidelink slots by detecting a resource of the total number of slots as being included in a sidelink channel occupancy (e.g., as described above in the second alternative). The sidelink resource determination component 240 may also determine that the resource of the total number of slots is free of transmissions from RATs other than sidelink communications (e.g., as described above in the second alternative). The sidelink resource determination component 240 may determine the resource as one of the number of sidelink resources or sidelink slots based on determining that the resource is not included in a sidelink channel occupancy and the resource is free of transmissions from RATs other than sidelink communications. On determining that the resource is included in a sidelink channel occupancy, or the resource includes transmissions from RATs other than sidelink communications, the sidelink resource determination component 240 may determine the resources as a non-sidelink occupied resource.

Thus, in a summary example, the UE performs CBR measurement in a CBR measurement window (e.g., 100 slots). The UE determines that n1 slots are V2X slots, and n2 slots are non-V2X slots (n1+n2=100). In the n1 slots, there are m1 subchannels in total, and mb of the subchannels are identified as busy (e.g., these subchannels have SL RSSI higher than RSSI threshold). In the n2 slots, there are m2 subchannels in total; so there are m1+m2 subchannels in the CBR measurement window in total. In the first sub-alternative of the first alternative, the UE determines first CBR as mb/m1, and second CBR as (mb/m1)*(n1/100). The UE determines CR limit based at least on the second CBR. In the second sub-alternative of the first alternative, the UE determines CBR as mb/(m1+m2). The UE determines CR limit based at least on the CBR. In the second alternative, the UE determines CBR as mb/m1, and the non-V2X ratio is n2/100. The UE determines CR limit based at least on the CBR and the non-V2X resource ratio. The UE uses the determined CR limit for congestion control.

Figure 10:
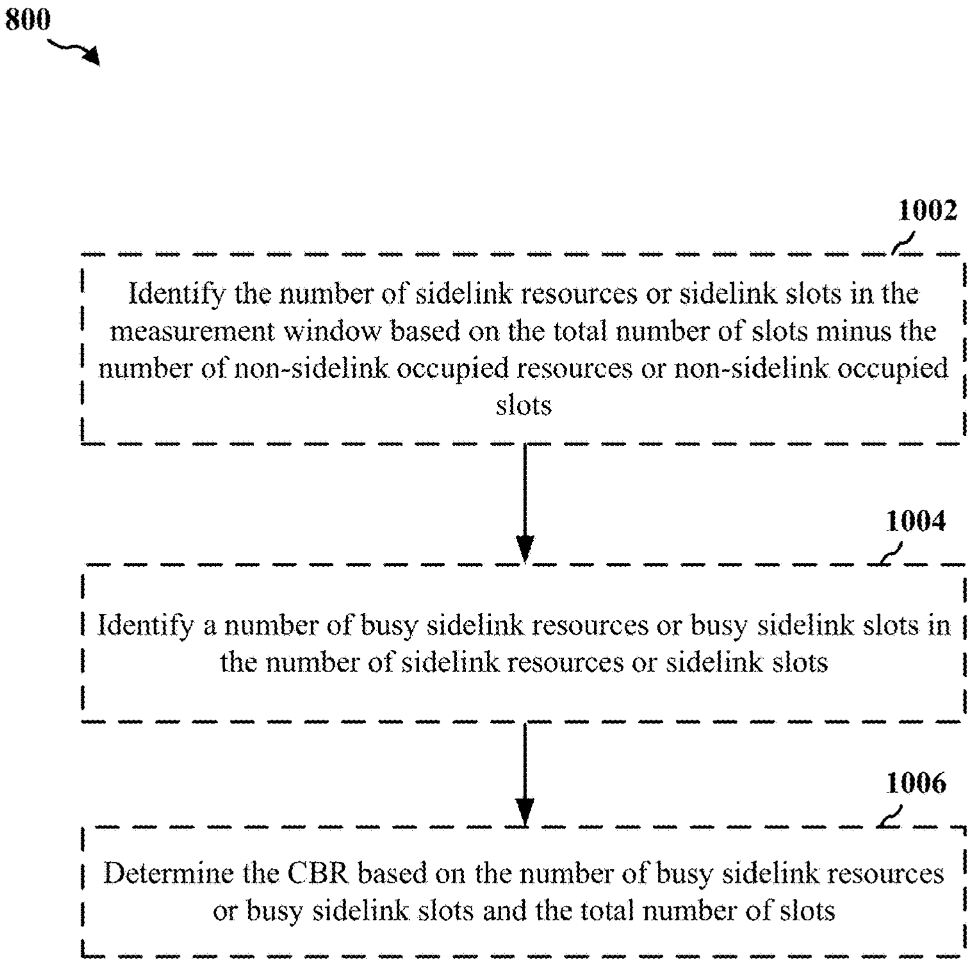
FIG. 10 is another example flowchart for optional operations for the method in the example flowchart of FIG. 8.
Figure 11:
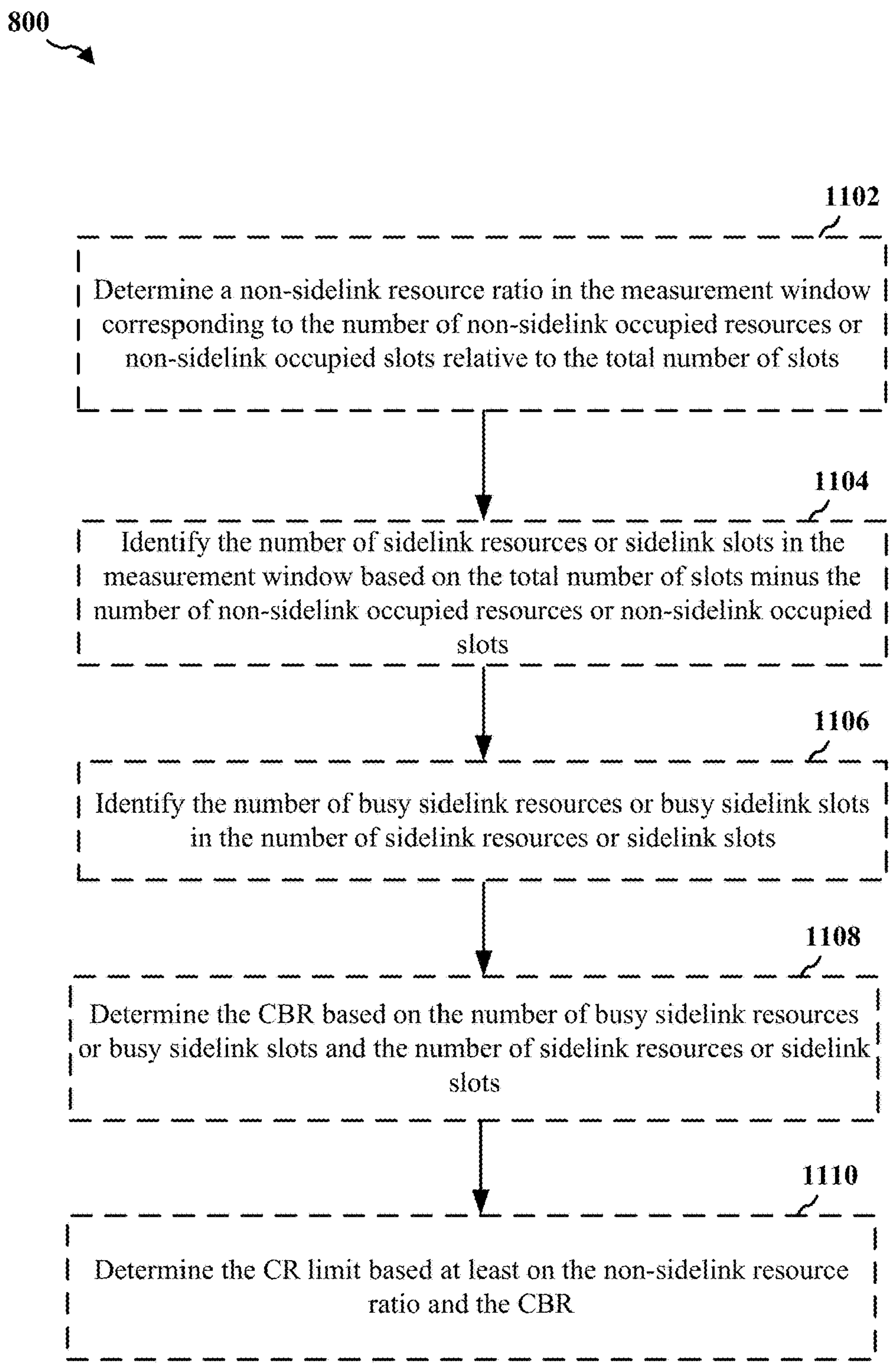
FIG. 11 is another example flowchart for optional operations for the method in the example flowchart of FIG. 8.
Figure 12:
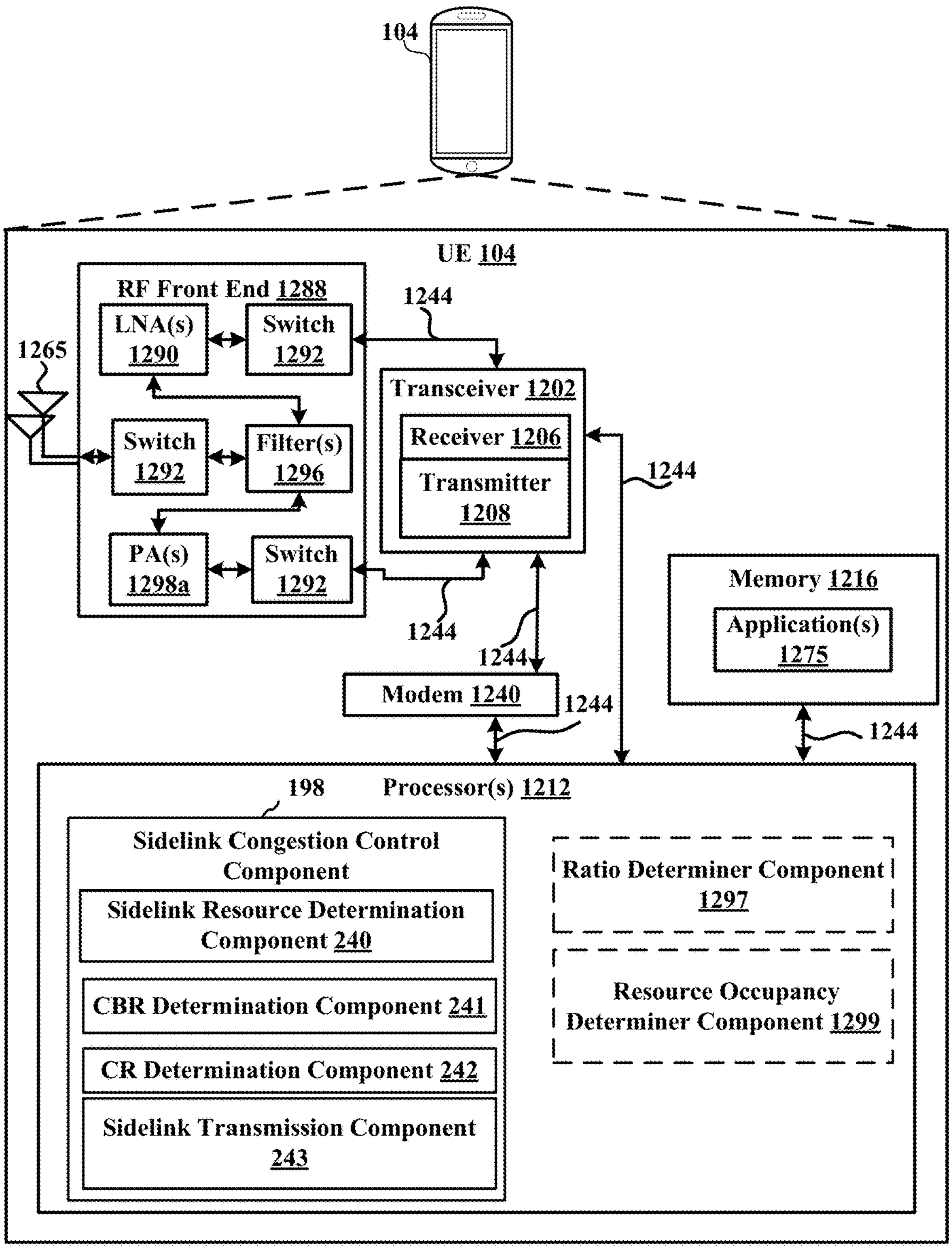
FIG. 12 is a block diagram illustrating an example of a UE having a sidelink congestion control component, in accordance with various aspects of the present disclosure.

Referring to FIGS. 8-12, an example method 800 of sidelink communication is described with reference to FIGS. 8-11, and the method 800 may be performed by the UE 104, which may include one or more components as discussed in FIG. 12. Thus, the following discussion refers to the method 800 of FIGS. 8-11, and the corresponding UE 104 and/or UE components of FIG. 12 in one example of sidelink congestion control for sidelink transmission by the UE 104.

At 802, method 800 includes identifying a number of non-sidelink occupied resources or non-sidelink occupied slots in a measurement window having a total number of slots in an unlicensed spectrum, wherein the total number of slots can be used by sidelink transmissions and non-sidelink transmissions. For example, in an aspect, UE 104, processor(s) 1212, memory 1216, modem 1240, sidelink congestion control component 198, and/or sidelink resource determination component 240 may be configured to or may define means for identifying the number of non-sidelink occupied resources or non-sidelink occupied slots in the CBR measurement window 602 having the total number of slots in the unlicensed spectrum (as described above).

In an alternative or additional aspect, the method 800 may further include identifying the number of non-sidelink occupied resources or non-sidelink occupied slots in the measurement window based on determining a number of sidelink resources or sidelink slots in the measurement window, wherein determining the number of sidelink resources or sidelink slots comprising determining whether an existing sidelink channel or a sidelink signal is detected in each resource or slot of the total number of slots, and determining a resource of the total number of slots to be identified as one of the number of sidelink resources or sidelink slots based on determining that the existing sidelink channel or the sidelink signal is detected. For example, in an aspect, processor(s) 1212, memory 1216, modem 1240, RF front end 1288, antennae 1265, sidelink congestion control component 198, and/or sidelink resource determination component may operate to perform the above mentioned steps as described above with reference to the first alternative for determining the V2X/non-V2X resources.

In an alternative or additional aspect, the method 800 may further include identifying the number of non-sidelink occupied resources or non-sidelink occupied slots in the measurement window is based on determining a number of sidelink resources or sidelink slots in the measurement window, wherein determining the number of sidelink resources or sidelink slots comprising determining whether a resource or slot of the total number of slots is included in a sidelink channel occupancy, and determining the resource or slot of the total number of slots to be identified as one of the number of sidelink resources or sidelink slots based on determining that the resource or slot is included in the sidelink channel occupancy. For example, in an aspect, processor(s) 1212, memory 1216, modem 1240, RF front end 1288, antennae 1265, sidelink congestion control component 198, and/or sidelink resource determination component may operate to perform the above mentioned steps as described above with reference to the second alternative for determining the V2X/non-V2X resources.

In the above alternative or additional aspect, the method 800 may further include determining whether each resource of the total number of slots is included in the sidelink channel occupancy by determining a respective resource or slot of the total number of slots to be identified as one of a number of sidelink resources or sidelink slots based on detecting at least one of decoding a first signaling in the respective resource or slot indicating that the resource or slot is included in the sidelink channel occupancy, decoding a second signaling in an earlier resource or slot relative to the respective resource or slot, the second signaling indicating that the respective resource or slot is included in the sidelink channel occupancy, or decoding a third signaling in a later resource or slot relative to the respective resource or slot, the third signaling indicating that the respective resource or slot is included in the sidelink channel occupancy. For example, in an aspect, processor(s) 1212, memory 1216, modem 1240, RF front end 1288, antennae 1265, sidelink congestion control component 198, and/or sidelink resource determination component may operate to perform the above mentioned steps as described above with reference to the second alternative for determining the V2X/non-V2X resources.

In an alternative or additional aspect, the method 800 may further include identifying the number of non-sidelink occupied resources or non-sidelink occupied slots in the measurement window is based on determining a number of sidelink resources or sidelink slots in the measurement window, wherein determining the number of sidelink resources or sidelink slots comprising, determining whether a resource or slot of the total number of slots includes a transmission from one or more radio access technologies (RATs) different from a sidelink communication, and determining the resource or slot of the total number of slots to be identified as one of the number of sidelink resources or sidelink slots based on determining that the resource includes an absence of transmission from the one or more RATs different from the sidelink communication. For example, in an aspect, processor(s) 1212, memory 1216, modem 1240, RF front end 1288, antennae 1265, sidelink congestion control component 198, and/or sidelink resource determination component may operate to perform the above mentioned steps as described above with reference to the third alternative for determining the V2X/non-V2X resources.

In the above alternative or additional aspect, the method 800 may further include determining that the resource includes an absence of the transmission from the one or more RATs different from the sidelink communication by measuring an energy level in one or more ED windows in the resource or the slot having the resource, determining that the energy level is less than or equal to an ED threshold. For example, in an aspect, processor(s) 1212, memory 1216, modem 1240, RF front end 1288, antennae 1265, sidelink congestion control component 198, and/or sidelink resource determination component may operate to perform the above mentioned steps as described above with reference to the third alternative for determining the V2X/non-V2X resources.

In the above alternative or additional aspect, the ED window is a time window in a gap portion of a slot in the measurement window, wherein the gap portion has no sidelink transmissions.

In an alternative or additional aspect, the method 800 may further include identifying the number of non-sidelink occupied resources or non-sidelink occupied slots in the measurement window based on determining a number of sidelink resources or sidelink slots in the measurement window, wherein determining the number of sidelink resources or sidelink slots comprising, detecting a resource or slot of the total number of slots as being included in a sidelink channel occupancy, and detecting the resource or slot of the total number of slots as being free of transmissions from radio access technologies (RATs) other than sidelink communications.

At 804, method 800 includes determining a CR limit for a sidelink transmission based on at least a CBR determined accounting for at least the number of non-sidelink occupied resources or non-sidelink occupied slots in the measurement window. For example, in an aspect, UE 104, processor(s) 1212, memory 1216, modem 1240, RF front end 1288, antennae 1265, sidelink congestion control component 198, CBR determination component 241 and/or CR determination component 242 may be configured to or may define means for determining the CBR and the CR limit based at least on the CBR in the CBR measurement window 602 (as described above).

At 806, method 800 includes calculating a CR for the sidelink transmission. For example, in an aspect, UE 104, processor(s) 1212, memory 1216, modem 1240, transceiver 1202, RF front end 1288, antennae 1265, sidelink congestion control component 198, and/or CR determination component 242 may be configured to or may define means for calculating the CR for the sidelink transmission. In one example, the CR determination component 242 may calculate the CR in a CR evaluation window (as described above with reference to determining the V2X/non-V2X resources).

At 808, method 800 includes transmit, or refraining from transmitting, the sidelink transmission respectively based on whether the CR does not or does exceed the CR limit. For example, in an aspect, UE 104, processor(s) 1212, memory 1216, modem 1240, transceiver 1202, sidelink congestion control component 198, and/or sidelink transmission component 243 may be configured to or may define means for transmitting, or refraining from transmitting, the sidelink transmission respectively based on whether the CR does not or does exceed the CR limit (as described above).

In an alternative or additional aspect, the method 800 may further include transmitting, or refraining from transmitting, the sidelink transmission respectively based on whether the CR does not or does exceed the CR limit by the refraining from transmitting the sidelink transmission when the CR exceeds the CR limit. For example, in an aspect, UE 104, processor(s) 1212, memory 1216, modem 1240, transceiver 1202, sidelink congestion control component 198, and/or sidelink transmission component 243 may be configured to or may define means for transmitting, or refraining from transmitting, the sidelink transmission respectively based on whether the CR does not or does exceed the CR limit (as described above).

Figure 9:
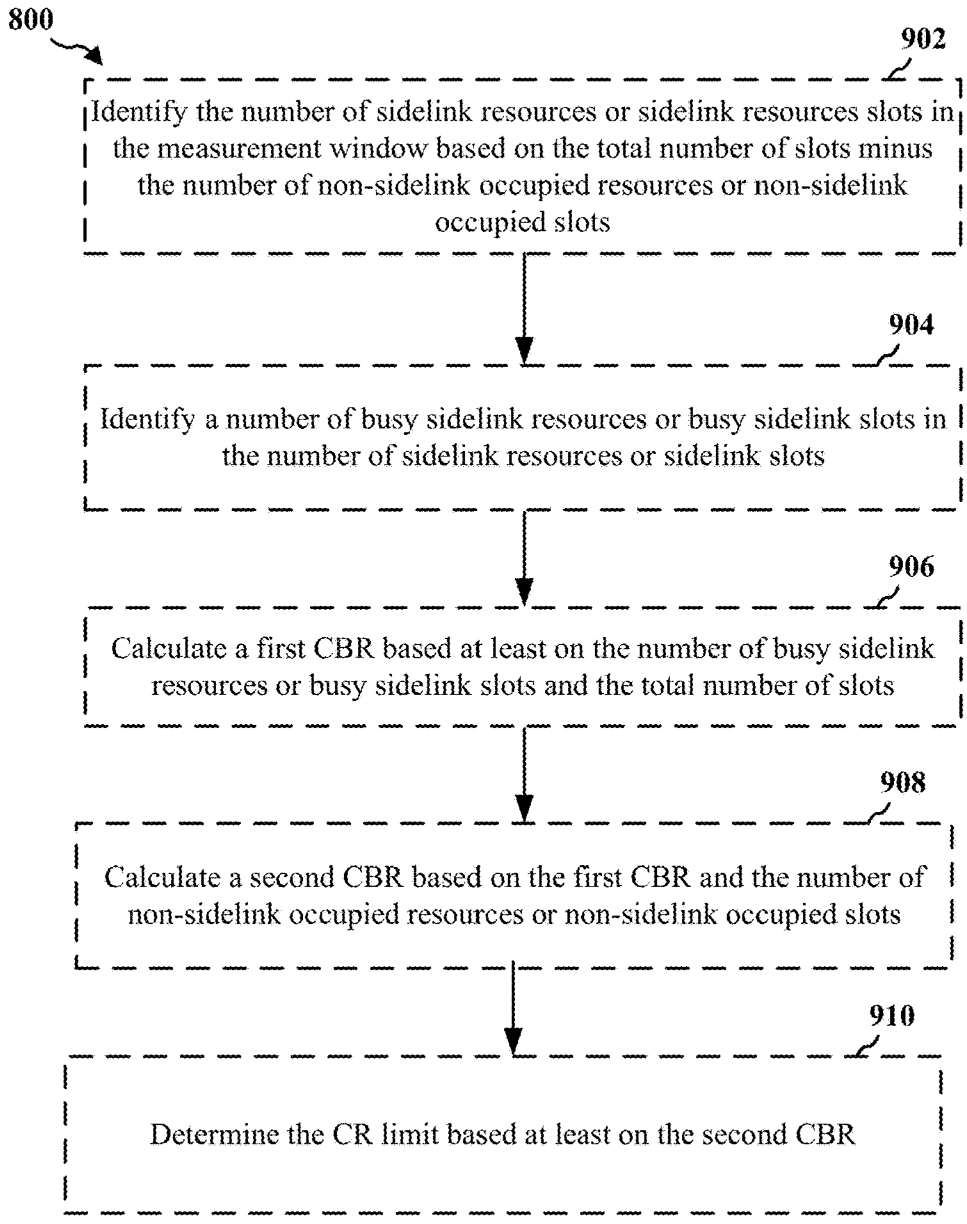
FIG. 9 is another example flowchart for optional operations for the method in the example flowchart of FIG. 8.

Referring to FIG. 9, additional/optional operations for the method 800, as described above with reference to FIG. 8 may be performed by processor(s) 1212, memory 1216, modem 1240, and/or sidelink congestion control component 198 of the UE 104 in conjunction with one or more components of the UE 104 as illustrated in FIG. 12.

At 902, the method 800 optionally includes identifying the number of sidelink resources or sidelink slots in the measurement window based on the total number of slots minus the number of non-sidelink occupied resources or non-sidelink occupied slots. For example, in an aspect, processor(s) 1212, memory 1216, modem 1240, sidelink congestion control component 198, sidelink resource determination component 240, and/or CBR determination component 241 may be configured to or may define means for identifying the number of sidelink resources or sidelink slots in the measurement window based on the total number of slots minus the number of non-sidelink occupied resources or non-sidelink occupied slots as described above with reference to the first sub-alternative of the first alternative for determining the CR limit.

At 904, the method 800 further includes identifying a number of busy sidelink resources or busy sidelink slots in the number of sidelink resources or sidelink slots. For example, in an aspect, processor(s) 1212, memory 1216, modem 1240, sidelink congestion control component 198, sidelink resource determination component 240, and/or CBR determination component 241 may be configured to or may define means for identifying a number of busy sidelink resources or busy sidelink slots in the number of sidelink resources or sidelink slots as described above with reference to the first sub-alternative of the first alternative for determining the CR limit.

At 906, the method 800 optionally includes calculating a first CBR based at least on the number of busy sidelink resources or busy sidelink slots and the total number of slots. For example, in an aspect, processor(s) 1212, memory 1216, modem 1240, sidelink congestion control component 198, and/or CBR determination component 241 may be configured to or may define means for calculating a first CBR based at least on the number of busy sidelink resources or busy sidelink slots and the total number of slots as described above with reference to the first sub-alternative of the first alternative for determining the CR limit.

At 908, the method 800 optionally includes calculating a second CBR based on the first CBR and the number of non-sidelink occupied resources or non-sidelink occupied slots. For example, in an aspect, processor(s) 1212, memory 1216, modem 1240, sidelink congestion control component 198, and/or CBR determination component 241 may be configured to or may define means for calculating the second CBR based on the first CBR and the number of non-sidelink occupied resources or non-sidelink occupied slots as described above with reference to the first sub-alternative of the first alternative for determining the CR limit.

At 910, the method 800 optionally includes determining the CR limit based at least on the second CBR. For example, in an aspect, processor(s) 1212, memory 1216, modem 1240, sidelink congestion control component 198, and/or CR determination component 242 may be configured to or may define means for determining the CR limit based at least on the second CBR as described above with reference to the first sub-alternative of the first alternative for determining the CR limit.

In an optional or additional aspect, the method 800 optionally includes determining an nSLRR based on the number of non-sidelink occupied resources or non-sidelink occupied slots in the measurement window relative to the total number of slots in the measurement window. For example, in an aspect, processor(s) 1212, memory 1216, modem 1240, sidelink congestion control component 198, CBR determination component 241 and/or resource occupancy determiner component 1299 may operate to determine the nSLRR based on the number of non-sidelink occupied resources or non-sidelink occupied slots in the CBR measurement window 602 relative to the total number of slots in the CBR measurement window 602 as described above with reference to the first sub-alternative of the first alternative for determining the CR limit.

In the above case, the method 800 optionally includes calculating the second CBR by multiplying the first CBR by (1−nSLRR). For example, in an aspect, processor(s) 1212, memory 1216, modem 1240, sidelink congestion control component 198, and/or CBR determination component 241 may operate to determine the second CBR by multiplying the first CBR by (1−nSLRR) as described above with reference to the first sub-alternative of the first alternative for determining the CR limit.

Referring to FIG. 10, additional/optional operations for the method 800, as described above with reference to FIG. 8 may be performed by processor(s) 1212, memory 1216, modem 1240, and/or sidelink congestion control component 198 of the UE 104 in conjunction with one or more components of the UE 104 as illustrated in FIG. 12.

At 1002, the method 800 optionally includes identify the number of sidelink resources or sidelink slots in the measurement window based on the total number of slots minus the number of non-sidelink occupied resources or non-sidelink occupied slots. For example, in an aspect, processor(s) 1212, memory 1216, modem 1240, sidelink congestion control component 198, sidelink resource determination component 240, and/or CBR determination component 241 may be configured to or may define means for identifying the number of sidelink resources or sidelink slots in the CBR measurement window 602 based on the total number of slots minus the number of non-sidelink occupied resources or non-sidelink occupied slots as described above with reference to the second sub-alternative of the first alternative for determining the CR limit.

At 1004, the method 800 optionally includes identifying a number of busy sidelink resources or busy sidelink slots in the number of sidelink resources or sidelink slots. For example, in an aspect, processor(s) 1212, memory 1216, modem 1240, sidelink congestion control component 198, sidelink resource determination component 240, and/or CBR determination component 241 may be configured to or may define means for identifying the number of busy sidelink resources or busy sidelink slots in the number of sidelink resources or sidelink slots as described above with reference to the second sub-alternative of the first alternative for determining the CR limit.

At 1006, the method 800 optionally includes determining the CBR based on the number of busy sidelink resources or busy sidelink slots and the total number of slots. For example, in an aspect, processor(s) 1212, memory 1216, modem 1240, sidelink congestion control component 198, and/or CBR determination component 241 may be configured to or may define means for determining the CBR based on the number of busy sidelink resources or busy sidelink slots and the total number of slots as described above with reference to the second sub-alternative of the first alternative for determining the CR limit.

Referring to FIG. 11, additional/optional operations for the method 800, as described above with reference to FIG.

8 may be performed by processor(s) 1212, memory 1216, modem 1240, and/or sidelink congestion control component 198 of the UE 104 in conjunction with one or more components of the UE 104 as illustrated in FIG. 12.

At 1102, the method 800 optionally includes determining a non-sidelink resource ratio in the measurement window corresponding to the number of non-sidelink occupied resources or non-sidelink occupied slots relative to the total number of slots. For example, in an aspect, processor(s) 1212, memory 1216, modem 1240, sidelink congestion control component 198, sidelink resource determination component 240, CBR determination component 241 and/or ratio determiner component 1297 may be configured to or may define means for determining the non-sidelink resource ratio in the CBR measurement window 602 corresponding to the number of non-sidelink occupied resources or non-sidelink occupied slots relative to the total number of slots as described above with reference to the second alternative for determining the CR limit.

At 1104, the method 800 optionally includes identifying the number of sidelink resources or sidelink slots in the measurement window based on the total number of slots minus the number of non-sidelink occupied resources or non-sidelink occupied slots. For example, in an aspect, processor(s) 1212, memory 1216, modem 1240, sidelink congestion control component 198, sidelink resource determination component 240, and/or CBR determination component 241 may be configured to or may define means for identifying the number of sidelink resources or sidelink slots in the CBR measurement window 602 based on the total number of slots minus the number of non-sidelink occupied resources or non-sidelink occupied slots as described above with reference to the second alternative for determining the CR limit.

At 1106, the method 800 optionally includes identifying the number of busy sidelink resources or busy sidelink slots in the number of sidelink resources or sidelink slots. For example, in an aspect, processor(s) 1212, memory 1216, modem 1240, sidelink congestion control component 198, sidelink resource determination component 240, and/or CBR determination component 241 may be configured to or may define means for identifying the number of busy sidelink resources or busy sidelink slots in the number of sidelink resources or sidelink slots.

For example, in an aspect, identifying the number of busy sidelink resources or busy sidelink slots in the number of sidelink resources or sidelink slots includes performing a sidelink RSSI measurement in each of the slots of the sidelink resources, determining, for each of the slots the sidelink resources, whether the sidelink RSSI measurement is above the RSSI threshold, and determining a sidelink resource or slot of the number of sidelink resources or sidelink slots to be identified as one of the number of busy sidelink resources or busy sidelink slots based on determining that the sidelink RSSI measurement of the slot or all the slots in a sidelink resource is above the RSSI threshold. For example, in an aspect, processor(s) 1212, memory 1216, modem 1240, RF front end 1288, antennae 1265, sidelink congestion control component 198, and/or CBR determination component 241 may operate to perform the sidelink RSSI measurement and the above mentioned steps as described above with reference to the second alternative for determining the CR limit.

At 1108, the method 800 optionally includes determining the CBR based on the number of busy sidelink resources or busy sidelink slots and the number of sidelink resources or sidelink slots. For example, in an aspect, processor(s) 1212, memory 1216, modem 1240, sidelink congestion control component 198, and/or CBR determination component 241 may be configured to or may define means for determining the CBR based on the number of busy sidelink resources or busy sidelink slots and the number of sidelink resources or sidelink slots as described above with reference to the second alternative for determining the CR limit.

At 1110, the method 800 optionally includes determining the CR limit based at least on the non-sidelink resource ratio and the CBR. For example, in an aspect, processor(s) 1212, memory 1216, modem 1240, sidelink congestion control component 198, and/or CR determination component 242 may operate to determine the CR limit based at least on the non-sidelink resource ratio and the CBR as described above with reference to the second alternative for determining the CR limit.

Referring to FIG. 12, one example of the UE 104 may include a variety of components, some of which have already been described above and are described further herein, including components such as one or more processors 1212 and the memory 1216 and a transceiver 1202 in communication via one or more buses 1244, which may operate in conjunction with a modem 1240 and/or the sidelink congestion control component 198 for implementing congestion control for sidelink. The sidelink congestion control component 198 may include the sidelink resource determination component 240, the CBR determination component 241, the CR determination component 242, the sidelink transmission component 243 (as described above with reference to FIGS. 1-11), the ratio determiner component 1297 and the resource occupancy determiner component 1299 (as described above with reference to FIGS. 7-11).

In an aspect, the one or more processors 1212 can include the modem 1240 and/or can be part of the modem 1240 that uses one or more modem processors. Thus, the various functions related to sidelink congestion control component 198 may be included in the modem 1240 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with a transceiver 1202. In other aspects, some of the features of the one or more processors 1212 and/or the modem 1240 associated with the sidelink congestion control component 198 may be performed by the transceiver 1202.

Also, the memory 1216 may be configured to store data used herein and/or local versions of applications 1275 and/or one or more of its subcomponents being executed by at the least one processor 1212. The memory 1216 can include any type of computer-readable medium usable by a computer or the at least one processor 1212, such as random access memory (RAM), read only memory (ROM), tapes, magnetic discs, optical discs, volatile memory, non-volatile memory, and any combination thereof. In an aspect, for example, the memory 1216 may be a non-transitory computer-readable storage medium that stores one or more computer-executable codes defining the sidelink congestion control component 198 and/or one or more of its subcomponents, and/or data associated therewith, when the UE 104 is operating the at least one processor 1212 to execute the sidelink congestion control component 198 and/or one or more of its subcomponents.

The transceiver 1202 may include at least one receiver 1206 and at least one transmitter 1208. The receiver 1206 may include hardware and/or software executable by a processor for receiving data, the code comprising instructions and being stored in a memory (e.g., computer-readable medium). The receiver 1206 may be, for example, a radio frequency (RF) receiver. In an aspect, the receiver 1206 may receive signals transmitted by at the least one base station 102. Additionally, the receiver 1206 may process such received signals, and also may obtain measurements of the signals, such as, but not limited to, Ec/Io, signal-to-noise ratio (SNR), reference signal received power (RSRP), received signal strength indicator (RSSI), etc. The transmitter 1208 may include hardware and/or software executable by a processor for transmitting data, the code comprising instructions and being stored in a memory (e.g., computer-readable medium). A suitable example of the transmitter 1208 may including, but is not limited to, an RF transmitter.

Moreover, in an aspect, the UE 104 may include the RF front end 1288, which may operate in communication with one or more antennas 1265 and the transceiver 1202 for receiving and transmitting radio transmissions, for example, wireless communications transmitted by at the least one base station 102 or wireless transmissions transmitted by the UE 104. The RF front end 1288 may be connected to one or more antennas 1265 and can include one or more low-noise amplifiers (LNAs) 1290, one or more switches 1292, one or more power amplifiers (PAs) **1298*a*, and one or more filters 1296** for transmitting and receiving RF signals.

In an aspect, the LNA 1290 can amplify a received signal at a desired output level. In an aspect, each the LNA 1290 may have a specified minimum and maximum gain values. In an aspect, the RF front end 1288 may use one or more switches 1292 to select a particular LNA 1290 and its specified gain value based on a desired gain value for a particular application.

Further, for example, the one or more PA(s) **1298*a* may be used by the RF front end 1288 to amplify a signal for an RF output at a desired output power level. In an aspect, each the PA 1298*a* may have specified minimum and maximum gain values. In an aspect, the RF front end 1288 may use the one or more switches 1292 to select a particular PA 1298*a*** and its specified gain value based on a desired gain value for a particular application.

Also, for example, one or more filters 1296 can be used by the RF front end 1288 to filter a received signal to obtain an input RF signal. Similarly, in an aspect, for example, a respective filter 1296 can be used to filter an output from a respective PA **1298*a* to produce an output signal for transmission. In an aspect, each filter 1296 can be connected to a specific LNA 1290 and/or PA 1298*a*. In an aspect, the RF front end 1288 can use one or more switches 1292 to select a transmit or receive path using a specified filter 1296, the LNA 1290, and/or the PA 1298*a*, based on a configuration as specified by the transceiver 1202 and/or the processor 1212**.

As such, the transceiver 1202 may be configured to transmit and receive wireless signals through the one or more antennas 1265 via the RF front end 1288. In an aspect, transceiver may be tuned to operate at specified frequencies such that the UE 104 can communicate with, for example, the one or more base stations 102 or one or more cells associated with the one or more base stations 102. In an aspect, for example, modem 1240 can configure the transceiver 1202 to operate at a specified frequency and power level based on the UE configuration of the UE 104 and the communication protocol used by modem 1240.

In an aspect, the modem 1240 can be a multiband-multimode modem, which can process digital data and communicate with the transceiver 1202 such that the digital data is sent and received using the transceiver 1202. In an aspect, the modem 1240 can be multiband and be configured to support multiple frequency bands for a specific communications protocol. In an aspect, the modem 1240 can be multimode and be configured to support multiple operating networks and communications protocols. In an aspect, the modem 1240 can control one or more components of UE the 104 (e.g., the RF front end 1288, the transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 104 as provided by the network during cell selection and/or cell reselection.

In an aspect, the processor(s) 1212 may correspond to one or more of the processors described in connection with the UE in FIG. 4. Similarly, the memory 1216 may correspond to the memory described in connection with the UE in FIG. 4.

SOME FURTHER EXAMPLE CLAUSES

Additional examples are described in the following numbered clauses:

1. A method of sidelink communications, comprising:
 identifying a number of non-sidelink occupied resources in a measurement window having a total number of resources in an unlicensed spectrum, wherein the total number of resources can be used by sidelink transmissions and non-sidelink transmissions;
 determining a channel occupancy ratio (CR) limit for a sidelink transmission based on at least a channel busy ratio (CBR) determined accounting for at least the number of non-sidelink occupied resources in the measurement window;
 calculating a CR for the sidelink transmission; and
 transmitting, or refraining from transmitting, the sidelink transmission respectively based on whether the CR does not or does exceed the CR limit.

2. The method of clause 1, further comprising:
 identifying the number of sidelink resources in the measurement window based on the total number of resources minus the number of non-sidelink occupied resources;
 identifying a number of busy sidelink resources in the number of sidelink resources;
 calculating a first CBR based at least on the number of busy sidelink resources and the total number of resources;
 calculating a second CBR based on the first CBR and the number of non-sidelink occupied resources; and
 wherein determining the CR limit comprises determining the CR limit based at least on the second CBR.

3. The method of any of clauses 1 or 2, further comprising:
 determining a non-sidelink resource ratio (nSLRR) based on the number of non-sidelink occupied resources in the measurement window relative to the total number of resources in the measurement window; and
 wherein calculating the second CBR further comprises multiplying the first CBR by (1−nSLRR).

4. The method of clause 1, further comprising:

identifying the number of sidelink resources in the measurement window based on the total number of resources minus the number of non-sidelink occupied resources;

identifying a number of busy sidelink resources in the number of sidelink resources; and determining the CBR based on the number of busy sidelink resources and the total number of resources.

5. The method of clause 1, further comprising:

determining a non-sidelink resource ratio in the measurement window corresponding to the number of non-sidelink occupied resources relative to the total number of resources;

identifying the number of sidelink resources in the measurement window based on the total number of resources minus the number of non-sidelink occupied resources;

identifying the number of busy sidelink resources in the number of sidelink resources;

determining the CBR based on the number of busy sidelink resources and the number of sidelink resources; and wherein determining the CR limit further comprises determining the CR limit based at least on the non-sidelink resource ratio and the CBR.

6. The method of any of clauses 1 or 5, wherein identifying the number of busy sidelink resources comprises:

performing a sidelink received signal strength indicator (RSSI) measurement in each of the number of sidelink resources;

determining, for each of the number of sidelink resources, whether the sidelink RSSI measurement is above an RSSI threshold; and determining a sidelink resource of the number of sidelink resources to be identified as one of the number of busy sidelink resources based on determining that the sidelink RSSI measurement of the sidelink resource is above the RSSI threshold.

7. The method of any of clauses 1-5, wherein identifying the number of non-sidelink occupied resources in the measurement window is based on determining a number of sidelink resources in the measurement window, and wherein determining the number of sidelink resources comprises:

determining whether an existing sidelink channel or a sidelink signal is detected in each resource of the total number of resources; and determining a resource of the total number or resources to be identified as one of the number of sidelink resources based on determining that the existing sidelink channel or the sidelink signal is detected.

8. The method of any of clauses 1-5, wherein identifying the number of non-sidelink occupied resources in the measurement window is based on determining a number of sidelink resources in the measurement window, and wherein determining the number of sidelink resources comprises:

determining whether a resource of the total number of resources is included in a sidelink channel occupancy; and determining the resource of the total number of resources to be identified as one of the number of sidelink resources based on determining that the resource is included in the sidelink channel occupancy.

9. The method of any of clauses 1-5, or 8, wherein determining whether each resource of the total number of resources is included in the sidelink channel occupancy comprises determining a respective resource of the total number of resources to be identified as one of a number of sidelink resources based on detecting at least one of:

decoding a first signaling in the respective resource indicating that the resource is included in the sidelink channel occupancy;

decoding a second signaling in an earlier resource relative to the respective resource, the second signaling indicating that the respective resource is included in the sidelink channel occupancy; or decoding a third signaling in a later resource relative to the respective resource, the third signaling indicating that the respective resource is included in the sidelink channel occupancy.

10. The method of any of clauses 1-5, wherein identifying the number of non-sidelink occupied resources in the measurement window is based on determining a number of sidelink resources in the measurement window, wherein determining the number of sidelink resources comprises:

determining whether a resource of the total number of resources includes a transmission from one or more radio access technologies (RATs) different from a sidelink communication; and determining the resource of the total number of resources to be identified as one of the number of sidelink resources based on determining that the resource includes an absence of transmission from the one or more RATs different from the sidelink communication.

11. The method of any of clauses 1-5 or 10, wherein determining that the resource includes the absence of the transmission from the one or more RATs different from the sidelink communication comprises:

measuring an energy level in one or more energy detection (ED) windows in the resource; and determining that the energy level is less than or equal to an ED threshold.

12. The method of any of clauses 1-5, 10, or 11, wherein the ED window is a time window in a gap portion of a slot in the measurement window, wherein the gap portion has no sidelink transmissions.

13. The method of any of clauses 1-5, wherein identifying the number of non-sidelink occupied resources in the measurement window is based on determining a number of sidelink resources in the measurement window, wherein determining the number of sidelink resources comprises:

detecting a resource of the total number of resources as being included in a sidelink channel occupancy; and detecting the resource of the total number of resources as being free of transmissions from radio access technologies (RATs) other than sidelink communications.

14. The method of clause 1, wherein transmitting, or refraining from transmitting, sidelink transmission respectively based on whether the CR does not or does exceed the CR limit comprises the refraining from transmitting the sidelink transmission when the CR exceeds the CR limit.

15. An apparatus for sidelink communication, comprising:

a memory configured to store instructions; and a processor communicatively coupled with the memory, wherein the processor is configured to:

identify a number of non-sidelink occupied resources in a measurement window having a total number of resources in an unlicensed spectrum, wherein the total number of resources can be used by sidelink transmissions and non-sidelink transmissions;

determine a channel occupancy ratio (CR) limit for a sidelink transmission based on at least a channel busy ratio (CBR) determined accounting for at least the number of non-sidelink occupied resources in the measurement window;

calculate a CR for the sidelink transmission; and transmit, or refrain from transmitting, the sidelink transmission respectively based on whether the CR does not or does exceed the CR limit.

16. The apparatus of clause 15, wherein the processor is further configured to:

identify the number of sidelink resources in the measurement window based on the total number of resources minus the number of non-sidelink occupied resources;

identify a number of busy sidelink resources in the number of sidelink resources;

determine a first CBR based at least on the number of busy sidelink resources and the total number of resources;

determine a second CBR based on the first CBR and the number of non-sidelink occupied resources; and wherein to determine the CR limit the processor is configured to determine the CR limit based at least on the second CBR.

17. The apparatus of any of clauses 15 or 16, wherein the processor is further configured to:

determine a non-sidelink resource ratio (nSLRR) based on the number of non-sidelink occupied resources in the measurement window relative to the total number of resources in the measurement window; and wherein to determine the second CBR comprises the processor is configured to multiply the first CBR by (1−nSLRR).

18. The apparatus of clause 15, wherein the processor is further configured to:

identify the number of sidelink resources in the measurement window based on the total number of resources minus the number of non-sidelink occupied resources;

identify a number of busy sidelink resources in the number of sidelink resources; and determine the CBR based on the number of busy sidelink resources and the total number of resources.

19. The apparatus of clause 15, wherein the processor is further configured to:

determine a non-sidelink resource ratio in the measurement window corresponding to the number of non-sidelink occupied resources relative to the total number of resources;

identify the number of sidelink resources in the measurement window based on the total number of resources minus the number of non-sidelink occupied resources;

identify the number of busy sidelink resources in the number of sidelink resources;

determine the CBR based on the number of busy sidelink resources and the number of sidelink resources; and wherein to determine the CR limit the processor is configured to determine the CR limit based at least on the non-sidelink resource ratio and the CBR.

20. The apparatus of any of clauses 15 or 19, wherein to identify the number of busy sidelink resources the processor is configured to:

perform a sidelink received signal strength indicator (RSSI) measurement in each of the number of sidelink resources;

determine, for each of the number of sidelink resources, whether the sidelink RSSI measurement is above an RSSI threshold; and determine a sidelink resource of the number of sidelink resources to be identified as one of the number of busy sidelink resources based on determining that the sidelink RSSI measurement of the sidelink resource is above the RSSI threshold.

21. The apparatus of any of clauses 15-20, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources the processor is configured to:

determine whether an existing sidelink channel or a sidelink signal is detected in each resource of the total number of resources; and determine a resource of the total number or resources to be identified as one of the number of sidelink resources based on determining that the existing sidelink channel or the sidelink signal is detected.

22. The apparatus of any of clauses 15-20, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources the processor is configured to:

determine whether a resource of the total number of resources is included in a sidelink channel occupancy; and determine the resource of the total number of resources to be identified as one of the number of sidelink resources based on determining that the resource is included in the sidelink channel occupancy.

23. The apparatus of any of clauses 15-20, or 22, wherein to determine whether each resource of the total number of resources is included in the sidelink channel occupancy, the processor is configured to determine a respective resource of the total number of resources to be identified as one of a number of sidelink resources based on the processor being configured to detect at least one of:

decoding a first signaling in the respective resource indicating that the resource is included in the sidelink channel occupancy;

decoding a second signaling in an earlier resource relative to the respective resource, the second signaling indicating that the respective resource is included in the sidelink channel occupancy; or decoding a third signaling in a later resource relative to the respective resource, the third signaling indicating that the respective resource is included in the sidelink channel occupancy.

24. The apparatus of any of clauses 15-20, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources the processor is configured to:

determine whether a resource of the total number of resources includes a transmission from one or more radio access technologies (RATs) different from a sidelink communication; and determine the resource of the total number of resources to be identified as one of the number of sidelink resources based on determining that the resource includes an absence of transmission from the one or more RATs different from the sidelink communication.

25. The apparatus of any of clauses 15-20, or 24, wherein to determine that the resource includes the absence of the transmission from the one or more RATs different from the sidelink communication, the processor is configured to:

measure an energy level in one or more energy detection (ED) windows in the resource; and determine that the energy level is less than or equal to an ED threshold.

26. The apparatus of any of clauses 15-20, 24, or 25, wherein the ED window is a time window in a gap portion of a slot in the measurement window, and wherein the gap portion has no sidelink transmissions.

27. The apparatus of any of clauses 15-20, wherein to identify the number of non-sidelink occupied resources in the measurement window, the processor is configured to identify the number of non-sidelink occupied resources in the measurement window based on t determining a number of sidelink resources in the measurement window, and wherein to determine the number of sidelink resources the processor is configured to:

detect a resource of the total number of resources as being included in a sidelink channel occupancy; and detect the resource of the total number of resources as being free of transmissions from radio access technologies (RATs) other than sidelink communications.

28. The apparatus of clause 15, wherein to transmit, or to refrain from transmitting, the sidelink transmission respectively based on whether the CR does not or does exceed the CR limit, the processor is configured to refrain from transmitting the sidelink transmission when the CR exceeds the CR limit.

29. A non-statutory computer-readable medium storing instructions for sidelink communication, executable by a processor to store instructions, and one or more processors communicatively coupled with a memory, wherein the one or more processors are configured to:

identify a number of non-sidelink occupied resources in a measurement window having a total number of resources in an unlicensed spectrum, wherein the total number of resources can be used by sidelink transmissions and non-sidelink transmissions;

determine a channel occupancy ratio (CR) limit for a sidelink transmission based on at least a channel busy ratio (CBR) determined accounting for at least the number of non-sidelink occupied resources in the measurement window;

calculate a CR for the sidelink transmission; and transmit, or refraining from transmitting, the sidelink transmission respectively based on whether the CR does not or does exceed the CR limit.

30. An apparatus for sidelink communication, comprising:

means for identifying a number of non-sidelink occupied resources in a measurement window having a total number of resources in an unlicensed spectrum, wherein the total number of resources can be used by sidelink transmissions and non-sidelink transmissions;

means for determining a channel occupancy ratio (CR) limit for a sidelink transmission based on at least a channel busy ratio (CBR) determined accounting for at least the number of non-sidelink occupied resources in the measurement window;

means for calculating a CR for the sidelink transmission; and means for transmitting, or refraining from transmitting, the sidelink transmission respectively based on whether the CR does not or does exceed the CR limit.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of sidelink communications performed by a user equipment (UE), the method comprising:

identifying a number of non-sidelink occupied resources in a measurement window having a total number of resources in an unlicensed spectrum, wherein the total number of resources can be used by sidelink transmissions and non-sidelink transmissions;

identifying the number of sidelink resources in the measurement window based on the total number of resources minus the number of non-sidelink occupied resources;

identifying a number of busy sidelink resources in the number of sidelink resources;

determining a channel occupancy ratio (CR) limit for a sidelink transmission based on at least a channel busy ratio (CBR) determined accounting for at least the number of non-sidelink occupied resources in the measurement window, wherein determining the CR limit comprises:

calculating a first CBR based at least on the number of busy sidelink resources and the total number of resources;

calculating a second CBR based on the first CBR and the number of non-sidelink occupied resources; and determining the CR limit based at least on the second CBR; or determining the CR limit based at least on a non-sidelink resource ratio and the CBR;

calculating a CR for the sidelink transmission; and transmitting, or refraining from transmitting, the sidelink transmission respectively based on whether the CR does not or does exceed the CR limit.

2. The method of claim 1, further comprising:

determining a non-sidelink resource ratio (nSLRR) based on the number of non-sidelink occupied resources in the measurement window relative to the total number of resources in the measurement window; and wherein calculating the second CBR further comprises multiplying the first CBR by (1−nSLRR).

3. The method of claim 1, further comprising:

determining the non-sidelink resource ratio in the measurement window corresponding to the number of non-sidelink occupied resources relative to the total number of resources.

4. The method of claim 3, wherein identifying the number of busy sidelink resources comprises:

performing a sidelink received signal strength indicator (RSSI) measurement in each of the number of sidelink resources;

determining, for each of the number of sidelink resources, whether the sidelink RSSI measurement is above an RSSI threshold; and determining a sidelink resource of the number of sidelink resources to be identified as one of the number of busy sidelink resources based on determining that the sidelink RSSI measurement of the sidelink resource is above the RSSI threshold.

5. The method of claim 1, wherein identifying the number of non-sidelink occupied resources in the measurement window is based on determining a number of sidelink resources in the measurement window, and wherein determining the number of sidelink resources comprises:

determining whether an existing sidelink channel or a sidelink signal is detected in each resource of the total number of resources; and determining a resource of the total number or resources to be identified as one of the number of sidelink resources based on determining that the existing sidelink channel or the sidelink signal is detected.

6. The method of claim 1, wherein identifying the number of non-sidelink occupied resources in the measurement window is based on determining a number of sidelink resources in the measurement window, and wherein determining the number of sidelink resources comprises:

determining whether a resource of the total number of resources is included in a sidelink channel occupancy; and determining the resource of the total number of resources to be identified as one of the number of sidelink resources based on determining that the resource is included in the sidelink channel occupancy.

7. The method of claim 6, wherein determining whether each resource of the total number of resources is included in the sidelink channel occupancy comprises determining a respective resource of the total number of resources to be identified as one of a number of sidelink resources based on detecting at least one of:

decoding a first signaling in the respective resource indicating that the resource is included in the sidelink channel occupancy;

decoding a second signaling in an earlier resource relative to the respective resource, the second signaling indicating that the respective resource is included in the sidelink channel occupancy; or decoding a third signaling in a later resource relative to the respective resource, the third signaling indicating that the respective resource is included in the sidelink channel occupancy.

8. A method of sidelink communications, comprising:

identifying a number of non-sidelink occupied resources in a measurement window having a total number of resources in an unlicensed spectrum, wherein the total number of resources can be used by sidelink transmissions and non-sidelink transmissions, wherein identifying the number of non-sidelink occupied resources in the measurement window is based on determining a number of sidelink resources in the measurement window, wherein determining the number of sidelink resources comprises:

determining whether a resource of the total number of resources includes a transmission from one or more radio access technologies (RATs) different from a sidelink communication; and determining the resource of the total number of resources to be identified as one of the number of sidelink resources based on determining that the resource includes an absence of transmission from the one or more RATs different from the sidelink communication;

determining a channel occupancy ratio (CR) limit for a sidelink transmission based on at least a channel busy ratio (CBR) determined accounting for at least the number of non-sidelink occupied resources in the measurement window;

calculating a CR for the sidelink transmission; and transmitting, or refraining from transmitting, the sidelink transmission respectively based on whether the CR does not or does exceed the CR limit;

wherein determining that the resource includes the absence of the transmission from the one or more RATs different from the sidelink communication comprises:

measuring an energy level in one or more energy detection (ED) windows in the resource; and determining that the energy level is less than or equal to an ED threshold.

9. The method of claim 8, wherein the ED window is a time window in a gap portion of a slot in the measurement window, wherein the gap portion has no sidelink transmissions.

10. The method of claim 1, wherein identifying the number of non-sidelink occupied resources in the measurement window is based on determining a number of sidelink resources in the measurement window, wherein determining the number of sidelink resources comprises:

detecting a resource of the total number of resources as being included in a sidelink channel occupancy; and detecting the resource of the total number of resources as being free of transmissions from radio access technologies (RATs) other than sidelink communications.

11. The method of claim 1, wherein transmitting, or refraining from transmitting, sidelink transmission respectively based on whether the CR does not or does exceed the CR limit comprises the refraining from transmitting the sidelink transmission when the CR exceeds the CR limit.

12. An apparatus for sidelink communication, comprising:

a memory configured to store instructions; and a processor communicatively coupled with the memory, wherein the processor is configured to:

identify a number of non-sidelink occupied resources in a measurement window having a total number of resources in an unlicensed spectrum, wherein the total number of resources can be used by sidelink transmissions and non-sidelink transmissions;

identify the number of sidelink resources in the measurement window based on the total number of resources minus the number of non-sidelink occupied resources;

identify a number of busy sidelink resources in the number of sidelink resources;

determine a channel occupancy ratio (CR) limit for a sidelink transmission based on at least a channel busy ratio (CBR) determined accounting for at least the number of non-sidelink occupied resources in the measurement window, wherein determining the CR limit comprises:

calculating a first CBR based at least on the number of busy sidelink resources and the total number of resources;

calculating a second CBR based on the first CBR and the number of non-sidelink occupied resources; and calculating a first CBR and a second CBR and determining the CR limit based at least on the second CBR; or determining the CR limit based at least on a non-sidelink resource ratio and the CBR;

calculate a CR for the sidelink transmission; and transmit, or refrain from transmitting, the sidelink transmission respectively based on whether the CR does not or does exceed the CR limit.

13. The apparatus of claim 12, wherein the processor is further configured to:

determine a non-sidelink resource ratio (nSLRR) based on the number of non-sidelink occupied resources in the measurement window relative to the total number of resources in the measurement window; and wherein to determine the second CBR comprises the processor is configured to multiply the first CBR by (1−nSLRR).

14. The apparatus of claim 12, wherein the processor is further configured to:

determine the non-sidelink resource ratio in the measurement window corresponding to the number of non-sidelink occupied resources relative to the total number of resources;

identify the number of sidelink resources in the measurement window based on the total number of resources minus the number of non sidelink occupied resources; and identify the number of busy sidelink resources in the number of sidelink resources;

determine the CBR based on the number of busy sidelink resources and the number of sidelink resources.

15. The apparatus of claim 14, wherein to identify the number of busy sidelink resources, the processor is configured to:

perform a sidelink received signal strength indicator (RSSI) measurement in each of the number of sidelink resources;

determine, for each of the number of sidelink resources, whether the sidelink RSSI measurement is above an RSSI threshold; and determine a sidelink resource of the number of sidelink resources to be identified as one of the number of busy sidelink resources based on determining that the sidelink RSSI measurement of the sidelink resource is above the RSSI threshold.

16. The apparatus of claim 12, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources, the processor is configured to:

determine whether an existing sidelink channel or a sidelink signal is detected in each resource of the total number of resources; and determine a resource of the total number or resources to be identified as one of the number of sidelink resources based on determining that the existing sidelink channel or the sidelink signal is detected.

17. The apparatus of claim 12, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources the processor is configured to:

determine whether a resource of the total number of resources is included in a sidelink channel occupancy; and determine the resource of the total number of resources to be identified as one of the number of sidelink resources based on determining that the resource is included in the sidelink channel occupancy.

18. The apparatus of claim 17, wherein to determine whether each resource of the total number of resources is included in the sidelink channel occupancy, the processor is configured to determine a respective resource of the total number of resources to be identified as one of a number of sidelink resources based on the processor being configured to detect at least one of:

decoding a first signaling in the respective resource indicating that the resource is included in the sidelink channel occupancy;

decoding a second signaling in an earlier resource relative to the respective resource, the second signaling indicating that the respective resource is included in the sidelink channel occupancy; or decoding a third signaling in a later resource relative to the respective resource, the third signaling indicating that the respective resource is included in the sidelink channel occupancy.

19. An apparatus for sidelink communication, comprising:

a memory configured to store instructions; and a processor communicatively coupled with the memory, wherein the processor is configured to:

identify a number of non-sidelink occupied resources in a measurement window having a total number of resources in an unlicensed spectrum, wherein the total number of resources can be used by sidelink transmissions and non-sidelink transmissions, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources, the processor is configured to:

determine whether a resource of the total number of resources includes a transmission from one or more radio access technologies (RATs) different from a sidelink communication; and determine the resource of the total number of resources to be identified as one of the number of sidelink resources based on determining that the resource includes an absence of transmission from the one or more RATs different from the sidelink communication;

determine a channel occupancy ratio (CR) limit for a sidelink transmission based on at least a channel busy ratio (CBR) determined accounting for at least the number of non-sidelink occupied resources in the measurement window;

calculate a CR for the sidelink transmission; and transmit, or refrain from transmitting, the sidelink transmission respectively based on whether the CR does not or does exceed the CR limit;

wherein to determine that the resource includes the absence of the transmission from the one or more RATs different from the sidelink communication, the processor is configured to:

measure an energy level in one or more energy detection (ED) windows in the resource; and determine that the energy level is less than or equal to an ED threshold.

20. The apparatus of claim 19, wherein the ED window is a time window in a gap portion of a slot in the measurement window, and wherein the gap portion has no sidelink transmissions.

21. The apparatus of claim 12, wherein to identify the number of non-sidelink occupied resources in the measurement window, the processor is configured to identify the number of non-sidelink occupied resources in the measurement window based on determining a number of sidelink resources in the measurement window, and wherein to determine the number of sidelink resources, the processor is configured to:

detect a resource of the total number of resources as being included in a sidelink channel occupancy; and detect the resource of the total number of resources as being free of transmissions from radio access technologies (RATs) other than sidelink communications.

22. The apparatus of claim 12, wherein to transmit, or to refrain from transmitting, the sidelink transmission respectively based on whether the CR does not or does exceed the CR limit, the processor is configured to refrain from transmitting the sidelink transmission when the CR exceeds the CR limit.

* * * * *